(12) United States Patent
Fukunishi

(10) Patent No.: US 6,839,099 B2
(45) Date of Patent: Jan. 4, 2005

(54) LIQUID CRYSTAL DISPLAY DEVICE AND DEFICIENCY CORRECTING METHOD THEREOF

(75) Inventor: Ichiro Fukunishi, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/871,468

(22) Filed: May 31, 2001

(65) Prior Publication Data

US 2001/0052889 A1 Dec. 20, 2001

(30) Foreign Application Priority Data

May 31, 2000 (JP) .......................................... 2000-163279
Feb. 15, 2001 (JP) .......................................... 2001-039105

(51) Int. Cl.⁷ .......................... G02F 1/1333; G02F 1/13; G02F 1/1343
(52) U.S. Cl. ............................. 349/54; 349/192; 349/39
(58) Field of Search .......................... 349/39, 54, 192, 349/139, 38, 41; 257/71, 72

(56) References Cited

U.S. PATENT DOCUMENTS 5,173,792 A * 12/1992 Matsueda ..................... 359/59
6,025,892 A    2/2000 Kawai et al. ................. 349/43

FOREIGN PATENT DOCUMENTS

| JP | 04080723 | 3/1992 | ............ G02F/1/136 |
| JP | 06-326920 | 12/1994 | ......... G02F/1/1343 |
| JP | 8-184842 | 7/1996 | |
| TW | 448332 | 8/2001 | |

OTHER PUBLICATIONS

Taiwan Patent Office First Office Action dated Mar. 9, 2004 (3pp.) for application No. 090112931 and English Translation (4pp).

* cited by examiner

Primary Examiner—Tarifur R. Chowdhury
Assistant Examiner—Hoan C. Nguyen
(74) Attorney, Agent, or Firm—Edwards & Angell, LLP; David G. Conlin; George W. Hartnell, LLP

(57) ABSTRACT

A connection electrode and an island connection electrode which are coupled with each other via a drain thin line portion are serially provided at two different portions in an extension direction of a drain electrode of a TFT. The two connection and island connection electrodes are respectively connected to a pixel electrode via contact holes respectively formed in a layer insulating film. The distantly disposed connection electrode is stacked onto an auxiliary capacitance electrode via a gate insulating film in-between so as to form a storage capacitance. The island connection electrode is stacked onto an island auxiliary capacitance electrode via the gate insulating film in-between so as to form an island storage capacitance. The island auxiliary capacitance electrode is connected to the auxiliary capacitance electrode through an auxiliary capacitance electrode thin line portion. A liquid crystal display device having this arrangement is capable of an easy correction of leaking defects between the auxiliary capacitance electrode and the drain electrode and between source wiring and the drain electrode, and normalization of pixels.

16 Claims, 9 Drawing Sheets

LIQUID CRYSTAL DISPLAY DEVICE AND DEFICIENCY CORRECTING METHOD THEREOF

FIELD OF THE INVENTION

The present invention relates to a liquid crystal display device having gate wiring and source wiring disposed in the form of a lattice, and a deficiency correcting method thereof. The liquid crystal display device has a switching element, a pixel electrode to be connected to a drain electrode of the switching element, and an auxiliary capacitance electrode on each lattice point. In order to form a storage capacitance which is serially connected to the pixel electrode, the auxiliary capacitance electrode is formed through the same manufacturing steps as with the gate wiring, and the wiring of which is provided in parallel with the gate wiring.

BACKGROUND OF THE INVENTION

A liquid crystal display device is normally manufactured through a series of processes such as photoresist coating, exposing, developing, etching, and resist removing. In that case, deficiencies such as a break in wiring may be caused by extraneous adherents, flaws, irregular film thicknesses, and the like, that emerge during the foregoing processes.

Therefore, in that case, a method for mending a break in wiring is disclosed, for example, in Japanese Unexamined Patent Publication No. 184842/1996 (Tokukaihei 8-184842 published on Jul. 16, 1996). In this method, the break or a half broken portion in the wiring is supplied with a trace quantity of a metal complex solution and exposed to laser light so as to induce a thermal decomposing reaction in the exposed portion, thereby depositing a metallic thin film. Consequently, the break or the half broken portion in the wiring can be reconnected without affecting the surroundings, with low resistance and high credibility.

Meanwhile, as shown in FIG. 8, a liquid crystal panel 80 in a conventional liquid crystal display device commonly includes, for example, a lower glass substrate 81, an upper glass substrate 82, source wiring 83 for supplying a data signal, gate wiring 84 for supplying a scanning signal, a TFT (Thin Film Transistor) 85, a drain electrode 86, a contact hole 87, a pixel electrode 88, a liquid crystal layer 89 and a counter electrode 90.

The source wiring 83 and the gate wiring 84 are disposed on the lower glass substrate 81 in the form of a lattice. The TFT 85 is a switching element provided on each lattice point. The pixel electrode 88 is connected to the source wiring 83 so that they face each other via the TFT 85, the drain electrode 86 and the contact hole 87 in-between. The counter electrode 90 is disposed so as to face the pixel electrode 88 via the liquid crystal layer 89 in-between.

Recently, it has been often the case that the pixel electrode 88 is formed with a flattened film. Accordingly, an insulating protective film 91 is provided over the TFT 85, etc. Further, between the insulating protective film 91 and the pixel electrode 88 is provided a layer insulating film 92 for flattening the pixel electrode 88. Further, in order to connect the pixel electrode 88 and the drain electrode 86, a through hole is made in the layer insulating film 92, thereby forming the contact hole 87. The contact hole 87 is connected to a connection electrode 86a which is an extension portion of the drain electrode 86.

Further, the contact hole 87 can electrically be connected when the pixel electrode 88 only partially contacts the drain electrode 86. Therefore, as shown in FIG. 9, each pixel is provided with one contact hole 87.

Further, as shown in FIG. 8, on the lower glass substrate 81 is formed an auxiliary capacitance electrode 93 so as to be disposed in parallel with, and on the same side as, the gate wiring 84. On one side (a side closer to the liquid crystal layer 89) of the auxiliary capacitance electrode 93 is formed the connection electrode 86a via the gate insulating film 94 in-between. The connection electrode 86a is an extended portion of the drain electrode 86 and in contact with the contact hole 87.

Consequently, a superimposing portion of the auxiliary capacitance electrode 93 and the extended portion of the drain electrode 86 functions as a storage capacitance 95. In addition, it is arranged that the gate insulating film 94 sandwiched between the auxiliary capacitance electrode 93 and the connection electrode 86a of the drain electrode 86 acts as a dielectric layer of the storage capacitance 95.

However, the conventional liquid crystal display device and a deficiency correcting method thereof have such a problem that a leak which may occur between the auxiliary capacitance electrode 93 and the drain electrode 86 cannot be mended.

More specifically, when a leak occurs between the connection electrode 86a of the drain electrode 86 and the auxiliary capacitance electrode 93 that are shown in FIG. 9, disconnecting a thin line portion 86b of the drain electrode 86 still allows an electric potential of the pixel electrode 88 to drop into the auxiliary capacitance electrode 93 via the contact hole 87 and the connection electrode 86a. As a result, the pixel electrode 88 fails to maintain its electric potential, thereby becoming an OFF state. Thus, an attempt to mend leakage like this in the case of leakage comes to naught.

Likewise, in the case where a leak occurs between the source wiring 83 and the connection electrode 86a, a leaking portion cannot be mended in the foregoing manner. Specifically, disconnecting the thin line portion 86b of the drain electrode 86 in the same manner cannot prevent an electric potential of the pixel electrode 88 from dropping into the source wiring 83 via the contact hole 87 and the connection electrode 86a. As a result, the pixel electrode 88 fails to maintain its electric potential, thereby becoming the OFF state. Thus, the attempt to mend leakage like this comes to naught.

Note that, the foregoing applies to the case where a leak quantity is small. On the other hand, when a leak quantity is large, the pixel electrode 88 is constantly given a signal which is to be applied to the source wiring 83. As a result, the pixel electrode 88 stays OFF. Therefore, under such circumstances, disconnecting the thin line portion 86b of the drain electrode 86 cannot correct the deficiency, either.

Incidentally, in order to prevent a drop in a voltage of the pixel electrode 88 due to a leak between the auxiliary capacitance electrode 93 and the drain electrode 86, it may be attempted to remove a portion of the pixel electrode 88 having the contact hole 87. This, however, disables reproduction of the pixel.

Further, in the case of removing a portion of the pixel electrode 88 which is the contact hole 87, and in the case of failing to form the contact hole 87 in the forming process of a layer insulating film 92 (in the case where the contact hole 87 is formed in the layer insulating film 92), a problem arises in a normally white mode that a pixel of that portion always becomes a bright spot which makes such a defect highly noticeable.

Note that, a correcting method of a leaking defect of this kind is disclosed, for example, in Japanese Unexamined Patent Publication No. 80723/1992 (Tokukaihei 4-80723 published on Mar. 13, 1992). However, the target of a technique disclosed in this publication is a liquid crystal panel whose numerical aperture is small before correction. Moreover, when a leaking defect occurs in a conductor, the conductor is disconnected with a laser, thereafter requiring to connect a substitute conductor by melting. To this end, the correction is not always easy, and a success rate in the correction is not always high.

SUMMARY OF THE INVENTION

It is an object of the present invention to provide a liquid crystal display device and a deficiency correcting method thereof capable of an easy correction of leaking defects between an auxiliary capacitance electrode and a drain electrode and/or between source wiring and a drain electrode, and normalization of pixels.

In order to attain the foregoing object, a liquid crystal display device according to the present invention includes: gate wiring and source wiring disposed in a lattice state; a switching element provided on each lattice point; a pixel electrode to be connected to a drain electrode of the switching element; an auxiliary capacitance electrode which is formed in the same manufacturing process as the gate wiring and disposed in parallel with the gate wiring so as to form a storage capacitance which is serially connected to the pixel electrode; and electrodes which are serially disposed at two different portions on an extension portion of the drain electrode of the switching element in an extending direction and connected to each other via a coupling portion in-between, wherein: at least one of the two electrodes which is disposed closer to the switching element is connected to the pixel electrode via a through hole formed in a layer insulating film, and one of the two electrodes which is disposed more distant from the switching element than the other is stacked via the auxiliary capacitance electrode and an insulating film in-between so as to form the storage capacitance, whereas the electrode disposed closer to the switching element is stacked via an auxiliary capacitance electrode extension portion which is connected to the auxiliary capacitance electrode at an additional coupling portion, and the insulating film in-between so as to form an additional storage capacitance.

With the foregoing arrangement, when a short circuit occurs between the auxiliary capacitance electrode or source wiring and the distantly disposed electrode, a leaking defect can be corrected by disconnecting by laser light (hereinafter referred to as "laser-cutting") the coupling and additional coupling portions.

Note that, when the distantly disposed electrode is connected to the pixel electrode via another through hole which is formed in the layer insulating film, a leaking defect can be corrected further by electrically disconnecting the distantly disposed electrode from the pixel electrode.

Even when thus laser-cutting the coupling and additional coupling portions off and/or electrically disconnecting the distantly disposed electrode from the pixel electrode, the closer electrode is still in contact with the pixel electrode, thereby enabling a pixel in that portion to be electrically connected.

On the other hand, even when a short circuit occurs between the auxiliary capacitance electrode extension portion and the closer electrode, a leaking defect can be corrected by laser-cutting the coupling and additional coupling portions off.

Here, when thus cutting the coupling and additional coupling portions off, the pixel electrode stays short-circuited with the auxiliary capacitance electrode extension portion. However, the auxiliary capacitance electrode extension portion is disconnected from the auxiliary capacitance electrode and therefore acts as a drain electrode, thereby causing no adverse effect.

As a result, it is possible to provide a liquid crystal display device capable of an easy correction of leaking defects between the auxiliary capacitance electrode and the drain electrode and between the source wiring and the drain electrode, and normalization of pixels.

Further, a liquid crystal display device according to the present invention includes: gate wiring and source wiring disposed in a lattice state; a switching element provided on each lattice point; a pixel electrode to be connected to a drain electrode of the switching element; an auxiliary capacitance electrode which is formed in the same manufacturing process as the gate wiring and disposed in parallel with the gate wiring so as to form a storage capacitance which is serially connected to the pixel electrode; and electrodes which are disposed in parallel at two different portions on an extension portion of the drain electrode of the switching element in an extending direction and connected to each other via a coupling portion to connect with the drain electrode, and a branch coupling portion which branches off from the coupling portion in-between, wherein: the two electrodes are connected to the pixel electrodes via through holes which are respectively formed in a layer insulating film and stacked via the auxiliary capacitance electrode and insulating film so as to respectively form the storage capacitances.

with the foregoing arrangement, when a short circuit occurs between either one of the two electrodes and the auxiliary capacitance electrode or source wiring, a leaking defect can be corrected by laser-cutting the coupling or branch coupling portion which is connected to the electrode on a short-circuited side off, and further, by electrically disconnecting the electrode on the short-circuited side from the pixel electrode.

In addition, even when thus making a correction in which the electrode on the short-circuited side and the pixel electrode are electrically disconnected, the other electrode is still in contact with the pixel electrode, thereby enabling a pixel in that portion to be electrically connected with the drain electrode.

As a result, it is possible to provide a liquid crystal display device capable of an easy correction of leaking defects between the auxiliary capacitance electrode and the drain electrode and between the source wiring and the drain electrode, and normalization of pixels.

Further, a deficiency correcting method of a liquid crystal display device according to the present invention, the liquid crystal display device including: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, the liquid crystal display device further including electrodes which are serially disposed at two different portions on an extension portion of the drain electrode of the switching element in an extending direction and connected to each other via a coupling portion in-between, wherein: at least one of the two electrodes which is disposed closer to the switching element is connected to the pixel electrode via a through hole formed in a layer insulating film, and one of the two electrodes which is disposed more distant from the switching element than the other is stacked via the auxiliary capacitance electrode and an insulating film in-between so as to form the storage capacitance, whereas the electrode disposed closer to the switching element is stacked via an auxiliary capacitance electrode extension portion which is connected to the auxiliary capacitance electrode at an additional coupling portion, and the insulating film in-between so as to form an additional storage capacitance, the method comprising the step of laser-cutting the coupling portion and the additional coupling portion off when a short circuit occurs either between the auxiliary capacitance electrode and the distantly disposed electrode or between the auxiliary capacitance electrode extension portion and the electrode disposed closer to the switching element.

With the foregoing arrangement, in the liquid crystal display device, when a short circuit occurs either between the auxiliary capacitance electrode and the distantly disposed electrode or between the auxiliary capacitance electrode extension portion and the closer electrode, a leaking defect can be corrected by laser-cutting the coupling and additional coupling portions off.

Note that, when the distantly disposed electrode is connected to the pixel electrode via another through hole which is formed in the layer insulating film, a leaking defect can be corrected further by electrically disconnecting the distantly disposed electrode from the pixel electrode.

In addition, even when thus cutting the coupling and additional coupling portions off, the pixel electrode stays short-circuited with the auxiliary capacitance electrode extension portion. However, the auxiliary capacitance electrode extension portion is disconnected from the auxiliary capacitance electrode and therefore acts as a drain electrode, thereby causing no adverse effect.

As a result, it is possible to provide a deficiency correcting method of a liquid crystal display device capable of an easy correction of a leaking defect between the auxiliary capacitance electrode and the drain electrode, and normalization of pixels.

Further, a deficiency correcting method of a liquid crystal display device according to the present invention, the liquid crystal display device including: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, the liquid crystal display device further including electrodes which are disposed in parallel at two different portions on an extension portion of the drain electrode of the switching element in an extending direction and connected to each other via a coupling portion to connect with the drain electrode, and a branch coupling portion which branches off from the coupling portion in-between, wherein: the two electrodes are connected to the pixel electrodes via through holes which are respectively formed in a layer insulating film and stacked via the auxiliary capacitance electrode and insulating film so as to respectively form the storage capacitances, the method, when a short circuit occurs between either one of the two electrodes and the auxiliary capacitance electrode, comprising the steps of: laser-cutting the coupling portion or branch coupling portion that is connected to the electrode on a short-circuited side off; and electrically disconnecting the electrode on the short-circuited side from the pixel electrode.

With the foregoing arrangement, in the liquid crystal display device, when a short circuit occurs between either one of the two electrodes and the auxiliary capacitance electrode, a leaking defect can be corrected by laser-cutting the coupling or additional coupling portion which is connected to the electrode on a short-circuited side off, and further, by electrically disconnecting the electrode on the short-circuited side from the pixel electrode.

In addition, even when thus making a correction in which the coupling portion is laser-cut off, and the electrode on the short-circuited side and the pixel electrode are electrically disconnected, the other electrode is still in contact with the pixel electrode, thereby enabling a pixel in that portion to be electrically connected with the drain electrode.

As a result, it is possible to provide a deficiency correcting method of a liquid crystal display device capable of an easy correction of a leaking defect between the auxiliary capacitance electrode and the drain electrode, and normalization of pixels.

Further, a deficiency correcting method of a liquid crystal display device according to the present invention, the liquid crystal display device including: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, the liquid crystal display device further including electrodes which are serially disposed at two different portions on an extension portion of the drain electrode of the switching element in an extending direction and connected to each other via a coupling portion in-between, wherein: at least one of the two electrodes which is disposed closer to the switching element is connected to the pixel electrode via a through hole formed in a layer insulating film, and one of the two electrodes which is disposed more distant from the switching element than the other is stacked via the auxiliary capacitance electrode and an insulating film in-between so as to form the storage capacitance, whereas the electrode disposed closer to the switching element is stacked via an auxiliary capacitance electrode extension portion which is connected to the auxiliary capacitance electrode at an additional coupling portion, and the insulating film in-between so as to form an additional storage capacitance, the method comprising the step of laser-cutting the coupling portion and the additional coupling portion off when a short circuit occurs between the source wiring and the distantly disposed electrode.

With the foregoing arrangement, in the liquid crystal display device, when a short circuit occurs between the source wiring and the distantly disposed electrode, a leaking defect can be corrected by laser-cutting the coupling and additional coupling portions off.

Note that, when the distantly disposed electrode is connected to the pixel electrode via another through hole which is formed in the layer insulating film, a leaking defect can be corrected further by electrically disconnecting the distantly disposed electrode from the pixel electrode.

As a result, it is possible to provide a deficiency correcting method of a liquid crystal display device capable of an easy correction of a leaking defect between the source wiring and the drain electrode, and normalization of pixels.

Further, a deficiency correcting method of a liquid crystal display device according to the present invention, the liquid crystal display device including: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, the liquid crystal display device further including electrodes which are disposed in parallel at two different portions on an extension portion of the drain electrode of the switching element in an extending direction and connected to each other via a coupling portion to connect with the drain electrode, and a branch coupling portion which branches off from the coupling portion in-between, wherein: the two electrodes are connected to the pixel electrodes via through holes which are respectively formed in a layer insulating film and stacked via the auxiliary capacitance electrode and insulating film so as to respectively form the storage capacitances, the method, when a short circuit occurs between either one of the two electrodes and the source wiring, comprising the steps of: laser-cutting the coupling portion or branch coupling portion that is connected to the electrode on a short-circuited side off; and electrically disconnecting the electrode on the short-circuited side from the pixel electrode.

With the foregoing arrangement, in the liquid crystal display device, when a short circuit occurs between either one of the two electrodes and the source wiring, a leaking defect can be corrected by laser-cutting the coupling or additional coupling portion which is connected to the electrode on a short-circuited side off, and further, by disconnecting the electrode on the short-circuited side from the pixel electrode.

As a result, it is possible to provide a deficiency correcting method of a liquid crystal display device capable of an easy correction of a leaking defect between the source wiring and the drain electrode, and normalization of pixels.

Additional objects, features, and strengths of the present invention will be made clear by the description below. Further, the advantages of the present invention will be evident from the following explanation in reference to the drawings.

DESCRIPTION OF THE EMBODIMENTS

[First Embodiment]

Figure 1:
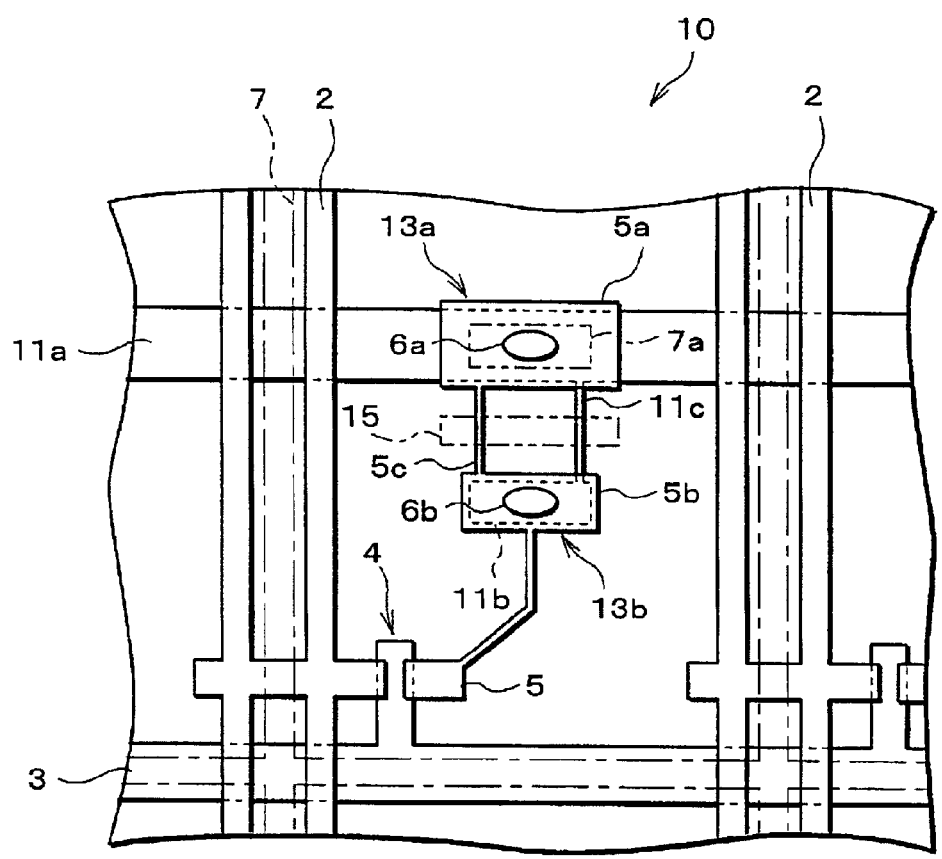
FIG. 1 is a plan view showing one embodiment of a liquid crystal display device and a deficiency correcting method thereof according to the present invention, and particularly a liquid crystal display panel.
Figure 2:
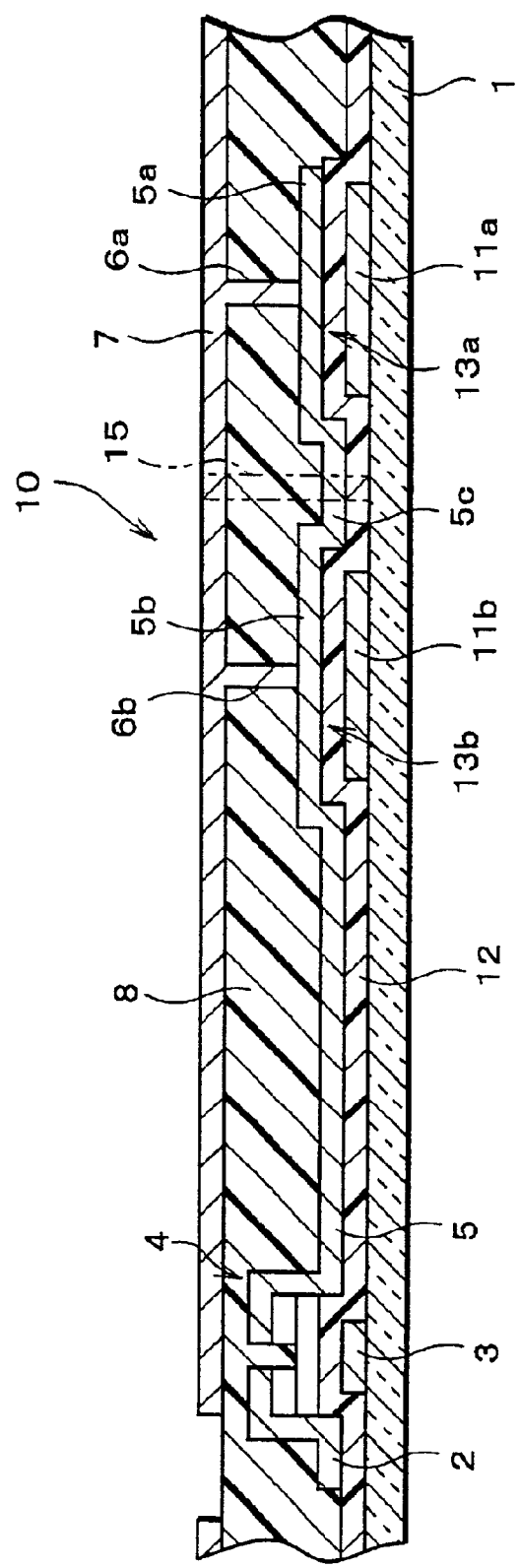
FIG. 2 is a cross sectional view of the liquid crystal display panel.

The following will explain one embodiment of the present invention with reference to FIGS. 1 and 2.

As shown in FIG. 2, a liquid crystal display panel 10 of a liquid crystal display device according to the present embodiment has a glass substrate 1, source wiring 2 for supplying a data signal, gate wiring 3 for supplying a scanning signal, a TFT (Thin Film Transistor) 4, a drain electrode 5, a connection electrode 5a as an electrode of one side more distant from the TFT 4 than the other, a contact hole 6a as a through hole, a pixel electrode 7, a liquid crystal layer (not shown), and a counter electrode (not shown).

The source wiring 2 and the gate wiring 3 are disposed in a lattice state on the glass substrate 1. The TFT 4 is a switching element provided on each lattice point. The connection electrode 5a is formed on an extension of the drain electrode 5 of the TFT 4. The pixel electrode 7 is connected to the source wiring 2 via the TFT 4, the drain electrode 5, the connection electrode 5a and the contact hole 6a in-between. The counter electrode is disposed so as to face the pixel electrode 7 via the liquid crystal layer in-between.

In recent years, the pixel electrode 7 has more often been formed with a flattened film, and so is the pixel electrode 7 of the present embodiment. The reason lies in intense irregularities made by a level gap in a direction of depth in an element region in the manufacture of the liquid crystal display panel 10, and particularly a difficulty in the application of a dry etching technique to the formation of the contact hole 6a and a wiring pattern. Therefore, between the pixel electrode 7 and another component such as the TFT 4 and the drain electrode 5 is provided a layer insulating film 8 for flattening the pixel electrode 7 and maintaining the both components in an insulated state.

Further, in order to connect the pixel electrode 7 and the connection electrode 5a of the drain electrode 5, a hole is made in the layer insulating film 8 and the contact hole 6a is provided therein. The contact hole 6a is in contact with the connection electrode 5a of the drain electrode 5.

On the other hand, on the glass substrate 1 is formed an auxiliary capacitance electrode 11a on the same side as, and in parallel with, the gate wiring 3. In addition, on a facing side (on a side closer to the liquid crystal layer) of the auxiliary capacitance electrode 11a is formed the connection electrode 5a of the drain electrode 5 via a gate insulating film 12 which is an insulating film in-between, and the contact hole 6a is in contact with the connection electrode 5a.

Accordingly, a superimposing portion between the auxiliary capacitance electrode 11a and the connection electrode 5a of the drain electrode 5 functions as a storage capacitance 13a. Further, the gate insulating film 12 sandwiched between the auxiliary capacitance electrode 11a and the connection electrode 5a of the drain electrode 5 is arranged to act as a dielectric layer of the storage capacitance 13a.

By thus providing the storage capacitance 13a, the total capacitance when the drain electrode 5 of the TFT 4 is a reference is increased, thereby increasing a charge-holding time constant. This prevents reduction in a pixel potential which may be caused by a leaking current and the like in the TFT 4. Further, a fluctuation in a pixel potential caused by a parasitic capacitance between the pixel electrode 7 and wiring when the gate voltage and the source voltage vary can be suppressed by the introduction of the storage capacitance 13a. As a result, occurrence of a display defect such as a baking flicker can be reduced.

Here, in the liquid crystal display panel 10 of the present embodiment, as shown in FIG. 1, an island connection electrode 5b is formed. The island connection electrode 5b is formed as an electrode provided closer to the front of the connection electrode 5a of the drain electrode 5. In other words, the island connection electrode 5b is formed on an extension of the drain electrode 5 and between the TFT 4 and the connection electrode 5a. The island connection electrode 5b and the connection electrode 5a are connected by a drain thin line portion 5c which is an individual coupling portion. The drain thin line portion 5c is set to be formed together with the island connection electrode 5b and the connection electrode 5a in the same manufacturing process as the drain electrode 5.

Further, as shown in FIG. 2, in a lower direction of the island connection electrode 5b is formed an island auxiliary capacitance electrode 11b which is an auxiliary capacitance electrode extension portion. The island auxiliary capacitance electrode 11b is formed in the same manufacturing process as the gate wiring 3 and the auxiliary capacitance electrode 11a. A superimposing portion between the island auxiliary capacitance electrode 11b and the island connection electrode 5b functions as an island storage capacitance 13b which is an additional storage capacitance. Further, the gate insulating film 12 between the island auxiliary capacitance electrode 11b and the island connection electrode 5b is arranged to act as a dielectric layer of the island storage-capacitance 13b.

Note that, though in the present embodiment is formed the island auxiliary capacitance electrode 11b, the formation of the island auxiliary capacitance electrode 11b is not always necessary in the present invention. An arrangement without forming the island auxiliary capacitance electrode 11b will be explained in a Third Embodiment below.

As shown in FIG. 1, the island auxiliary capacitance electrode 11b is connected to one auxiliary capacitance electrode 11a via an auxiliary capacitance electrode thin line portion 11c which is an additional coupling portion in-between. The auxiliary capacitance electrode thin line portion 11c is also formed in the same manufacturing process as the gate wiring 3, the island auxiliary capacitance electrode 11b and the auxiliary capacitance electrode 11a.

Furthermore, the island connection electrode 5b is in contact with the contact hole 6b which is a through hole of the pixel electrode 7. Therefore, in the present embodiment, with the contact holes 6a and 6b, the pixel electrode 7 is in contact with the drain electrode 5 at two portions: the connection electrode 5a and the island connection electrode 5b.

Next, the following will explain a correcting method of a leaking defect between the auxiliary capacitance electrode 11a and the connection electrode 5a of the drain electrode 5 in the liquid crystal display panel 10 of the liquid crystal display device having the foregoing arrangement. Note that, the liquid crystal display panel 10 herein is arranged to work in a normally white mode.

First, as to the liquid crystal display panel 10, at the time the pixel electrode 7 is formed, it is examined as to whether or not the pixel electrode 7 has a defect. Consequently, in the case a leak occurs in the auxiliary capacitance electrode 11a and the connection electrode 5a due to a short-circuit between the auxiliary capacitance electrode 11a and the connection electrode 5a of the drain electrode 5, the use of the liquid crystal display panel 10 according to the present embodiment as it is, that is, without disconnecting the drain thin line portion 5c and the auxiliary capacitance electrode thin line portion 11c, causes a signal which is applied to the auxiliary capacitance electrode 11a to be applied to the pixel electrode 7 as it is when the TFT 4 is ON, thereby appearing a pixel as a bright spot.

Consequently, when a leak occurs in the auxiliary capacitance electrode 11a and the connection electrode 5a of the drain electrode 5 due to a short-circuit between the auxiliary capacitance electrode 11a and the connection electrode 5a, as shown in FIG. 1, the drain thin line portion 5c that connects the connection electrode 5a and the island connection electrode 5b, and the auxiliary capacitance electrode thin line portion 11c that connects the auxiliary capacitance electrode 11a and the island auxiliary capacitance electrode 11b are exposed to laser light, thereby disconnecting them at each exposed portion 15.

Thus, the island storage capacitance 13b is separated from the auxiliary capacitance electrode 11a. In addition, here, the island storage capacitance 13b does not receive a signal from the auxiliary capacitance electrode 11a, and the island connection electrode 5b acts as the drain electrode 5.

Next, a region 7a of the connection electrode 5a where the contact hole 6a is formed is exposed to laser light so as to be removed.

Thus, when a leaking defect between the auxiliary capacitance electrode 11a and the connection electrode 5a of the drain electrode 5 occurs on the auxiliary capacitance electrode 11a, even if the drain thin line portion 5c and the auxiliary capacitance electrode thin line portion 11c are disconnected, a leak occurs in the auxiliary capacitance electrode 11a and the island connection electrode 5b of the drain electrode 5 through the contact hole 6b, the pixel electrode 7 and the contact hole 6a. Therefore, as described, the region 7a of the pixel electrode 7 which is the contact hole 6a portion on the auxiliary capacitance electrode 11a is thus removed by means of laser exposure, thereby disconnecting connection between the pixel electrode 7 and the connection electrode 5a of the drain electrode 5.

The foregoing method can cease a leak between the auxiliary capacitance electrode 11a and the drain electrode 5.

Meanwhile, there may be the case where a low brightness spot emerges in a pixel subject to correction due to insufficient holding of charges by the island storage capacitance 13b and a liquid crystal capacitance.

In that case, by the correction in which the source wiring 2 and the drain electrode 5 in the TFT 4 are short-circuited, a pixel can be formed with black spots.

As a result, a leaking defect between the auxiliary capacitance electrode 11a and the connection electrode 5a of the drain electrode 5 can be corrected. In addition, emergence of bright spots due to failure in the formation of the contact holes 6a and 6b can be reduced, thereby increasing a bright spot ratio, a good item ratio and a non-defective ratio of the liquid crystal display panel 10.

Thus, in the liquid crystal display device and the deficiency correcting method thereof according to the present embodiment, the liquid crystal display panel 10 includes gate wiring 3 and source wiring 2 which are disposed in a lattice state. Further, on the respective lattice points are formed the TFT 4, the pixel electrode 7 to be connected to the drain electrode 5 of the TFT 4, and the auxiliary capacitance electrode 11a. In order to form a storage capacitance 13a to be serially connected to the pixel electrode 7, the auxiliary capacitance electrode 11a is formed in the same manufacturing process as the gate wiring 3 and is wired in parallel with the gate wiring 3.

Meanwhile, a conventional liquid crystal display device has a problem such that a leak which may occur between the auxiliary capacitance electrode 11a and the connection electrode 5a of the drain electrode 5 cannot be mended.

However, in the liquid crystal display panel 10 in the liquid crystal display device according to the present embodiment, on an extension portion of the drain electrode 5 of the TFT 4 are serially provided in an extending direction two portions that are the connection electrode 5a and the island connection electrode 5b coupled with each other via the drain thin line portion 5c in-between. In addition, these two portions, the connection electrode 5a and the island connection electrode 5b are respectively connected to the pixel electrode 7 via the contact holes 6a and 6b which are respectively formed in the layer insulating film 8.

Further, the connection electrode 5a which is provided on the side more distant from the TFT 4 than the island connection electrode 5b is stacked via the auxiliary capacitance electrode 11a and the gate insulating film 12 in-between so as to form the storage capacitance 13a.

Further, the island connection electrode 5b is stacked via the island auxiliary capacitance electrode 11b, which is connected to the auxiliary capacitance electrode 11a through the auxiliary capacitance electrode thin line portion 11c, and the gate insulating film 12 in-between so as to form the island storage capacitance 13b.

Therefore, in the liquid crystal display panel 10 of the liquid crystal display device, when the auxiliary capacitance electrode 11a and the connection electrode 5a are short-circuited, a leaking defect can be mended by disconnection by laser light (hereinafter referred to as "laser-cutting") between the drain thin line portion 5c and the auxiliary capacitance electrode thin line portion 11a and, further, electrically separating the connection electrode 5a from the pixel electrode 7.

In addition, even when thus making a correction in which the connection electrode 5a and the pixel electrode 7 are electrically separated, the island connection electrode 5b is still in contact with the pixel electrode 7, thereby enabling a pixel in that portion to be electrically connected with the drain electrode 5.

As a result, it is possible to provide a liquid crystal display device and a deficiency correcting method thereof capable of an easy correction of a leaking defect between the auxiliary capacitance electrode 11a and the connection electrode 5a of the drain electrode 5 and normalization of pixels.

Incidentally, in the liquid crystal display panel 10 of the liquid crystal display device, when the island auxiliary capacitance electrode 11b and the island connection electrode 5b are short-circuited, a leaking defect can be mended by laser-cutting the drain thin line portion 5c and the auxiliary capacitance electrode thin line portion 11c off.

Further, even when thus disconnecting the drain thin line portion 5c and the auxiliary capacitance electrode thin line portion 11c, the pixel electrode 7 stays short-circuited with the island auxiliary capacitance electrode 11fb. However, the island auxiliary capacitance electrode 11b is already separated from the auxiliary capacitance electrode 11a and therefore does not act as the drain electrode 5, thus causing no adverse effect.

As a result, it is possible to provide a liquid crystal display device capable of an easy correction of a leaking defect between the island auxiliary capacitance electrode 11b and the drain electrode 5 and normalization of pixels.

Further, in the liquid crystal display panel 10 and the deficiency correcting method thereof, the drain thin line portion 5c and the auxiliary capacitance electrode thin line portion 11c are respectively made of thin lines.

Therefore, when laser-cutting the drain thin line portion 5c and the auxiliary capacitance electrode thin line portion 11c off, the thin lines require to be cut off, thereby surely and easily making a correction when a short circuit occurs. Note that, in the present invention, these portions are not necessarily be the thin lines, and a medium-size line other than a thin line can be adopted insofar as it can be laser-cut off.

Further, in the liquid crystal display panel 10 and the deficiency correcting method thereof, the connection electrode 5a and the island connection electrode 5b are pad electrodes. Therefore, it is possible to provide a liquid crystal display device and a deficiency correcting method thereof capable of an easy correction of a leaking defect and normalization of pixels in the liquid crystal display panel 10 adopting the pad electrodes as the connection electrode 5a and the island connection electrode 5b.

More specifically, the pad electrode is an electrode which covers a fixed region, thereby enabling an easy formation of the contact holes 6a and 6b, and also the storage capacitance 13a and the island storage capacitance 13b. This is therefore effective in the liquid crystal display panel 10 of this type. Note that, the use of the pad electrodes is not limited, and other electrodes can be adopted instead.

Further, in the liquid crystal display panel 10 and the deficiency correcting method thereof, it is possible to provide a liquid crystal display device and a deficiency correcting method thereof capable of an easy correction of a leaking defect and normalization of pixels in the liquid crystal display panel 10 adopting the TFT 4 as the switching element. Note that, this is not limited, and another switching element can be adopted instead.

[Second Embodiment]

Figure 3:
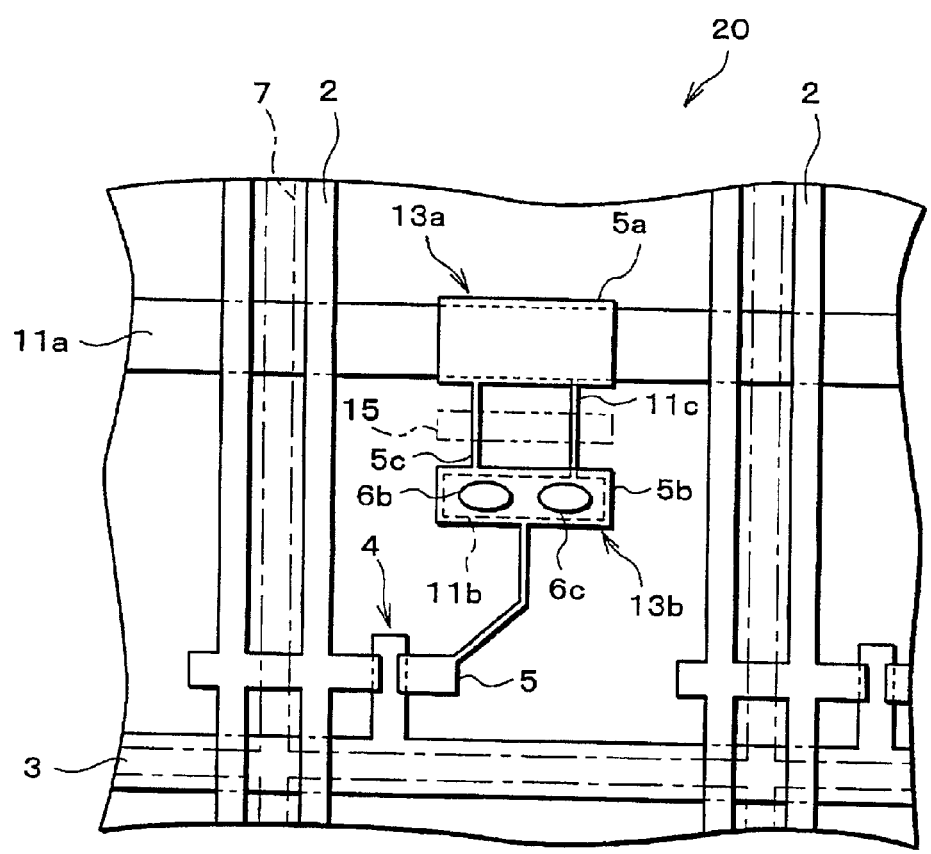
FIG. 3 is a plan view showing another embodiment of the liquid crystal display device and the deficiency correcting method of the same according to the present invention, and particularly a liquid crystal display panel.

The following will explain another embodiment of the present invention with reference to FIG. 3. For ease of explanation, components having the same functions as those shown in the drawings pertaining to the First Embodiment above will be given the same reference symbols, and explanation thereof will be omitted here. In addition, various features described in the First Embodiment are considered to be applicable in combination in the present embodiment.

A liquid crystal display panel 20 in a liquid crystal display device according to the present embodiment, as shown in FIG. 3, has an island connection electrode 5b formed in front of a connection electrode 5a of a drain electrode 5. To be more specific, the island connection electrode 5b is formed between a TFT 4 and the connection electrode 5a. In addition, the island connection electrode 5b and the connection electrode 5a are connected via an individual drain thin line portion 5c. The drain thin line portion 5c is formed in the same manufacturing process as the drain electrode 5.

Further, in a lower direction of the island connection electrode 5b, as with the First Embodiment, in order to form an island storage capacitance 13b, an island auxiliary capacitance storage electrode 11b which is formed in the same manufacturing process as the gate wiring 3 and an auxiliary capacitance electrode 11a is formed. Accordingly, the gate insulating film 12 between the island auxiliary capacitance electrode 11b and the island connection electrode 5b is arranged to act as a dielectric layer of the island storage capacitance 13b.

The island auxiliary capacitance electrode 11b is connected to an individual auxiliary capacitance electrode 11a through an auxiliary capacitance electrode thin line portion 11c. The auxiliary capacitance electrode thin line portion 11c is also formed in the same manufacturing process as the gate wiring 3, the island auxiliary capacitance electrode 11b and the auxiliary capacitance electrode 11a.

Here, in the liquid crystal display panel 20 according to the present embodiment, the island connection electrode 5b is in contact with two contact holes 6b and 6c of a pixel electrode 7. Note that, in the present embodiment, unlike the First Embodiment, there is no contact hole 6a on the connection electrode 5a.

Therefore, in the present embodiment, the pixel electrode 7 is in contact with the island connection electrode 5b at two portions that are the contact holes 6b and 6c.

Note that, in the present invention, this is not limited, and only one contact hole 6b can suffice. Moreover, the formation of the island auxiliary capacitance electrode 11b is not always necessary in the present invention.

The following will explain a correcting method of a leaking defect between the auxiliary capacitance electrode 11a and the connection electrode 5a of the drain electrode 5 in the liquid crystal display panel 20 of the liquid crystal display device having the foregoing arrangement.

Namely, first, in the liquid crystal display panel 20, at the time the pixel electrode 7 is formed, it is examined as to whether or not the pixel electrode 7 has a defect. As a result, when a leak occurs between the auxiliary capacitance electrode 11a and the connection electrode 5a of the drain electrode 5 due to a short circuit between the auxiliary capacitance electrode 11a and the connection electrode 5a, the drain thin line portion 5c that connects the connection electrode 5a and the island connection electrode 5b, and the auxiliary capacitance electrode thin line portion 11c that connects the auxiliary capacitance electrode 11a and the island auxiliary capacitance electrode 11b are exposed to laser light so as to disconnect them at each exposed portion 15.

Consequently, the island storage capacitance 13b is separated from the auxiliary capacitance electrode 11a. In addition, here, the island storage capacitance 13b does not receive a signal from the auxiliary capacitance electrode 11a, and the island connection electrode 5b acts as the drain electrode 5.

The foregoing method can thus cease a leak between the auxiliary capacitance electrode 11a and the drain electrode 5.

Meanwhile, there may be the case where a low brightness spot emerges in a pixel subject to correction due to insufficient holding of charges by the island storage capacitance 13b and a liquid crystal capacitance.

In that case, by the correction in which the source wiring 2 and the drain electrode 5 in the TFT 4 are short-circuited, a pixel can be formed with black spots.

Thus, in the liquid crystal display panel 20 in the liquid crystal display device and the deficiency correcting method thereof according to the present embodiment, on an extension portion of the drain electrode 5 of the TFT 4 are serially provided in an extending direction two portions that are the connection electrode 5a and the island connection electrode 5b coupled with each other via the drain thin line portion in-between.

Further, of these two connection electrode 5a and the island connection electrode 5b, the island connection electrode 5b which is closer to the TFT 4 is connected to the pixel electrode 7 via the contact holes 6b and 6c formed in a layer insulating film 8 in-between. In addition, the island connection electrode 5b is stacked via the island auxiliary capacitance electrode 11b, which is connected to the auxiliary capacitance electrode 11a through the auxiliary capacitance electrode thin line portion 11c, and the gate insulating film 12 in-between so as to form the island storage capacitance 13b.

Further, the connection electrode 5a provided on one side more distant from the TFT 4 than the other is stacked via the auxiliary capacitance electrode 11a and the gate insulating film 12 so as to form the storage capacitance 13a.

Consequently, in the liquid crystal display panel 20 of the liquid crystal display device, when the auxiliary capacitance electrode 11a and the connection electrode 5a on the side more distant from the TFT 4 are short-circuited, a leak defect can be mended by laser-cutting the drain thin line portion 5c and the auxiliary capacitance electrode thin line portion 11c off.

Further, even when thus making a correction in which the drain thin line portion 5c and the auxiliary capacitance electrode thin line portion 11c are laser-cut off, the island connection electrode 5b provided closer to the TFT 4 is still in contact with the pixel electrode 7, thereby enabling a pixel in that portion to be electrically connected with the drain electrode 5.

As a result, it is possible to provide a liquid crystal display device and a deficiency correcting method thereof capable of an easy correction of a leaking defect between the auxiliary capacitance electrode 11a and the connection electrode 5a of the drain electrode 5 and normalization of pixels.

Incidentally, in the liquid crystal display panel 20 of the liquid crystal display device, when the island auxiliary capacitance electrode 11b and the island connection electrode 5b are short-circuited, a leaking defect can be mended by laser-cutting the drain thin line portion 5c and the auxiliary capacitance electrode thin line portion 11c off.

Further, even when thus disconnecting the drain thin line portion 5c and the auxiliary capacitance electrode thin line portion 11c, the pixel electrode 7 stays short-circuited with the island auxiliary capacitance electrode 11b. However, the island auxiliary capacitance electrode 11b is already separated from the auxiliary capacitance electrode 11a and therefore does not act as the drain electrode 5, thus causing no adverse effect.

As a result, it is possible to provide a liquid crystal display device capable of an easy correction of a leaking defect between the island auxiliary capacitance electrode 11b and the drain electrode 5 (island connection electrode 5b) and normalization of pixels.

Further, in the liquid crystal display panel 20 and the deficiency correcting method thereof, the drain thin line portion 5c and the auxiliary capacitance electrode thin line portion 11c are respectively made of thin lines.

Therefore, when laser-cutting the drain thin line portion 5c and the auxiliary capacitance electrode thin line portion 11c off, the thin lines require to be cut off, thereby surely and easily making a correction when a short circuit occurs.

Further, in the liquid crystal display panel 20 and the deficiency correcting method thereof, the connection electrode 5a and the island connection electrode 5b are pad electrodes.

Therefore, it is possible to provide a liquid crystal display device and a deficiency correcting method thereof capable of an easy correction of a leaking defect and normalization of pixels in the liquid crystal display panel 20 adopting the pad electrodes as the connection electrode 5a and the island connection electrode 5b.

Further, in the liquid crystal display panel 20 and the deficiency correcting method thereof, it is possible to provide a liquid crystal display device and a deficiency correcting method thereof capable of an easy correction of a leaking defect and normalization of pixels in the liquid crystal display panel 20 adopting the TFT 4 as the switching element.

[Third Embodiment]

Figure 4:
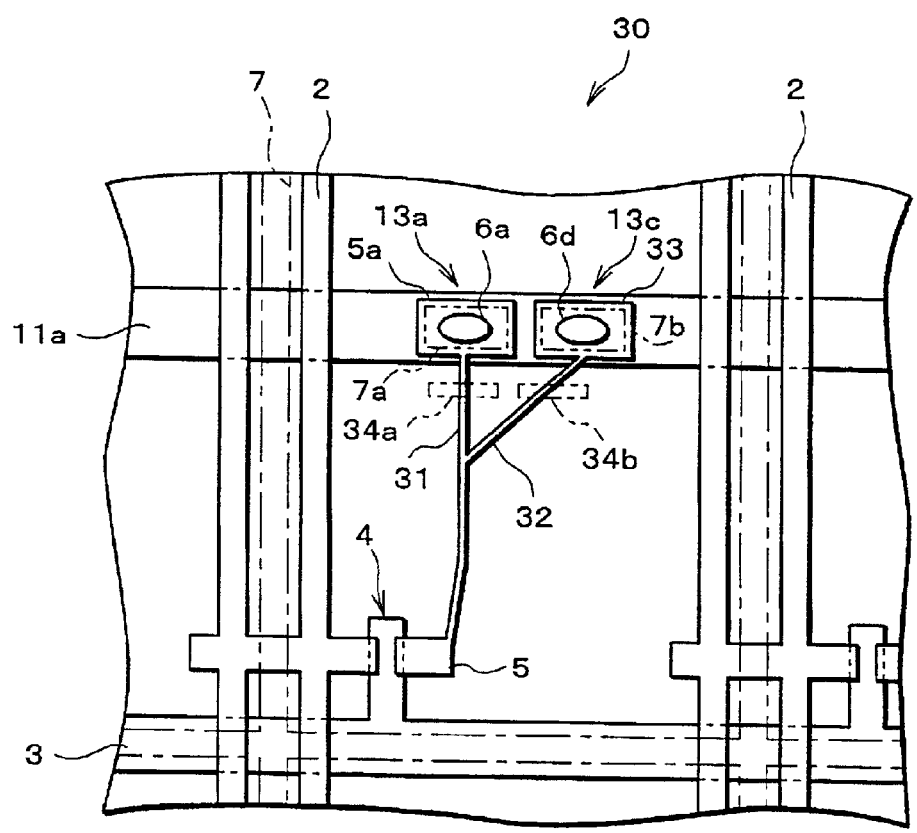
FIG. 4 is a plan view showing yet another embodiment of the liquid crystal display device and the deficiency correcting method of the same according to the present invention, and particularly a liquid crystal display panel.

The following will explain another embodiment of the present invention with reference to FIG. 4. For ease of explanation, components having the same functions as those shown in the drawings pertaining to the First and Second Embodiments above will be given the same reference symbols, and explanation thereof will be omitted here. In addition, various features described in the First and Second Embodiments are considered to be applicable in combination in the present embodiment.

In a liquid crystal display panel 30 in a liquid crystal display device according to the present embodiment, as shown in FIG. 4, a connection electrode 5a which is one of the two electrodes formed on an extension portion of a drain electrode 5 is, as with a conventional arrangement, continually extended in the form of a drain thin line portion 31 and disposed above an auxiliary capacitance electrode 11a. Further, on an upper side of the connection electrode 5a is provided a contact hole 6a which is a through hole of a pixel electrode 7 so as to be in contact with the connection electrode 5a.

On the other hand, in the present embodiment, a drain branch thin line portion 32 branches off at half way down from the drain thin line portion 31 which is extended from the drain electrode 5. In addition, at a lowest end of the drain branch thin line portion 32 is provided a branch-side connection electrode 33 which is one of the two electrodes above the auxiliary capacitance electrode 11a. Consequently, the connection electrode 5a and the branch-side connection electrode 33 are disposed side by side on the auxiliary capacitance electrode 11a.

As a result, an superimposing portion between the connection electrode 5a and the auxiliary capacitance electrode 11a functions as a storage capacitance 13a, whereas a superimposing portion between the branch-side connection electrode 33 and the auxiliary capacitance electrode 11a functions as a branch-portion storage capacitance 1c.

In addition, on an upper side of the branch-side connection electrode 33 is provided a contact hole 6d which is a through hole of the pixel electrode 7 so as to be in contact with the branch-side connection electrode 33.

Accordingly, in the liquid crystal display panel 30 according to the present embodiment, the pixel electrode 7 thus has two connections, one of which is a connection with the connection electrode 5a through the contact hole 6a and the other is a connection with the branch-side connection electrode 33 through the contact hole 6d.

Note that, the branch-side connection electrode 33, the drain branch thin line portion 32 and the contact hole 6d are respectively formed in the same manufacturing processes as the connection electrode 5a, the drain electrode 5 and the contact hole 6a.

The following will explain a correcting method of a leak defect between the auxiliary capacitance electrode 11a and the connection electrode 5a of the drain electrode 5, and a leak defect between the auxiliary capacitance electrode 11a and the branch-side connection electrode 33 in the liquid crystal display panel 30 having the foregoing arrangement.

Namely, first, in the liquid crystal display panel 30, at the time the pixel electrode 7 is formed, it is examined as to whether or not the pixel electrode 7 has a defect.

As a result, first, when a leak occurs between the auxiliary capacitance electrode 11a and the connection electrode 5a of the drain electrode 5 due to a short circuit between the auxiliary capacitance electrode 11a and the connection electrode 5a, the drain thin line portion 31 between the drain electrode 5 and the connection electrode 5a is exposed to laser light so as to disconnect them at an exposed portion 34a. Note that, a disconnecting portion of the drain thin line portion 31 in that case is closer to a lowest-end side than a branching portion of the drain branch thin line portion 32.

Incidentally, at this stage, there still is a leak between the auxiliary capacitance electrode 11a and the branch-side connection electrode 33 via the connection electrode 5a, the contact hole 6a, the pixel electrode 7 and the contact hole 6d in-between.

Therefore, the pixel electrode 7 on the contact hole 6a which is in contact with the connection electrode 5a is exposed to laser light, thereby removing a region 7a.

This can cease a leak between the auxiliary capacitance electrode 11a and the branch-side connection electrode 33 of the drain electrode 5. Further, in that case, the branch-portion storage capacitance 13c formed between the branch-side connection electrode 33 and the auxiliary capacitance electrode 11a holds charges, and therefore pixels can be normalized by sufficiently providing this capacitance.

On the other hand, in the case where a low brightness spot emerges due to insufficient holding of charges by the branch-portion storage capacitance 13c and a liquid crystal capacitance, making a correction in which the source wiring 2 and the drain electrode 5 in the TFT 4 are short-circuited can form a pixel with black spots.

Next, when a leak occurs between the auxiliary capacitance electrode 11a and the branch-side connection electrode 33 of the drain electrode 5 due to a short circuit between the auxiliary capacitance electrode 11a and the branch-side connection electrode 33, as with the foregoing, the drain branch thin line portion 32 between the drain electrode 5 and the branch-side connection electrode 33 is exposed to laser light so as to disconnect them at an exposed portion 34b.

At this stage, there still is a leak between the auxiliary capacitance electrode 11a and the connection electrode 5a via the branch-side connection electrode 33, the contact hole 6d, the pixel electrode 7 and the contact hole 6a in-between.

Therefore, the pixel electrode 7 on the contact hole 6d which is in contact with the branch-side connection electrode 33 is exposed to laser light, thereby removing a region 7b.

This can cease a leak between the auxiliary capacitance electrode 11a and the connection electrode 5a of the drain electrode 5. Further, in that case, the storage capacitance 13a formed between the connection electrode 5a and the auxiliary capacitance electrode 11a holds charges, and therefore pixels can be normalized by sufficiently providing this capacitance.

On the other hand, in the case where a low brightness spot emerges due to insufficient holding of charges by the storage capacitance 13a and a liquid crystal capacitance, making a correction in which the source wiring 2 and the drain electrode 5 in the TFT 4 are short-circuited can form a pixel with black spots.

Thus, in the liquid crystal display panel 30 in the liquid crystal display device and the deficiency correcting method thereof according to the present embodiment, on an extension portion of the drain electrode 5 of the TFT 4 are provided in parallel with an extending direction two portions that are the connection electrode 5a and the branch-side connection electrode 33 coupled with each other via the drain thin line portion 31 and the drain branch thin line portion 32 in-between.

Further, these two connection electrode 5a and the branch-side connection electrode 33 are respectively connected to the pixel electrode 7 through the contact hole 6a and 6d respectively formed in a layer insulating film 8. Moreover, the connection electrode 5a and the branch-side connection electrode 33 are stacked via a gate insulating film 12 in-between so as to respectively form the storage capacitance 13a and the branch-side storage capacitance 13c.

Consequently, in the liquid crystal display panel 30 of the liquid crystal display device, when either one of the two connection electrode 5a and the branch-side connection electrode 33, and the auxiliary capacitance electrode 11a are short-circuited, a leak defect can be mended by laser-cutting either the drain thin line portion 31 or the drain branch thin line portion 32 leading to the connection electrode 5a or the branch-side connection electrode 33 on the short-circuited side off, and further, by electrically separating the connection electrode 5a or the branch-side connection electrode 33 on the short-circuited side from the pixel electrode 7.

Further, even when thus making a correction in which the drain thin line portion 31 or drain branch thin line portion 32 is laser-cut off, and the connection electrode 5a or branch-side connection electrode 33 on the short-circuited side is electrically separated from the pixel electrode 7, the other branch-side connection electrode 33 or connection electrode 5a is still in contact with the pixel electrode 7, thereby enabling a pixel in that portion to be electrically connected with the drain electrode 5.

As a result, it is possible to provide a liquid crystal display device and a deficiency correcting method thereof capable of an easy correction of a leaking defect between the auxiliary capacitance electrode 11a and either the connection electrode 5a of the drain electrode 5 or the branch-side connection electrode 33, and normalization of pixels.

Incidentally, in the liquid crystal display panel 30 and the deficiency correcting method thereof, the drain thin line portion 31 and the drain branch thin line portion 32 are respectively made of thin lines.

Therefore, when laser-cutting the drain thin line portion 31 and the drain branch thin line portion 32 off, the thin lines require to be cut off, thereby surely and easily making a correction when a short circuit occurs.

Further, in the liquid crystal display panel 30 and the deficiency correcting method thereof, the connection electrode 5a and the branch-side connection electrode 33 are pad electrodes.

Therefore, it is possible to provide a liquid crystal display device and a deficiency correcting method thereof capable of an easy correction of a leaking defect and normalization of pixels in the liquid crystal display panel 30 adopting the pad electrodes as the connection electrode 5a and the branch-side connection electrode 33.

Further, in the liquid crystal display panel 30 and the deficiency correcting method thereof, it is possible to provide a liquid crystal display device and a deficiency correcting method thereof capable of an easy correction of a leaking defect and normalization of pixels in the liquid crystal display panel 30 adopting the TFT 4 as the switching element.

[Fourth Embodiment]

Figure 5:
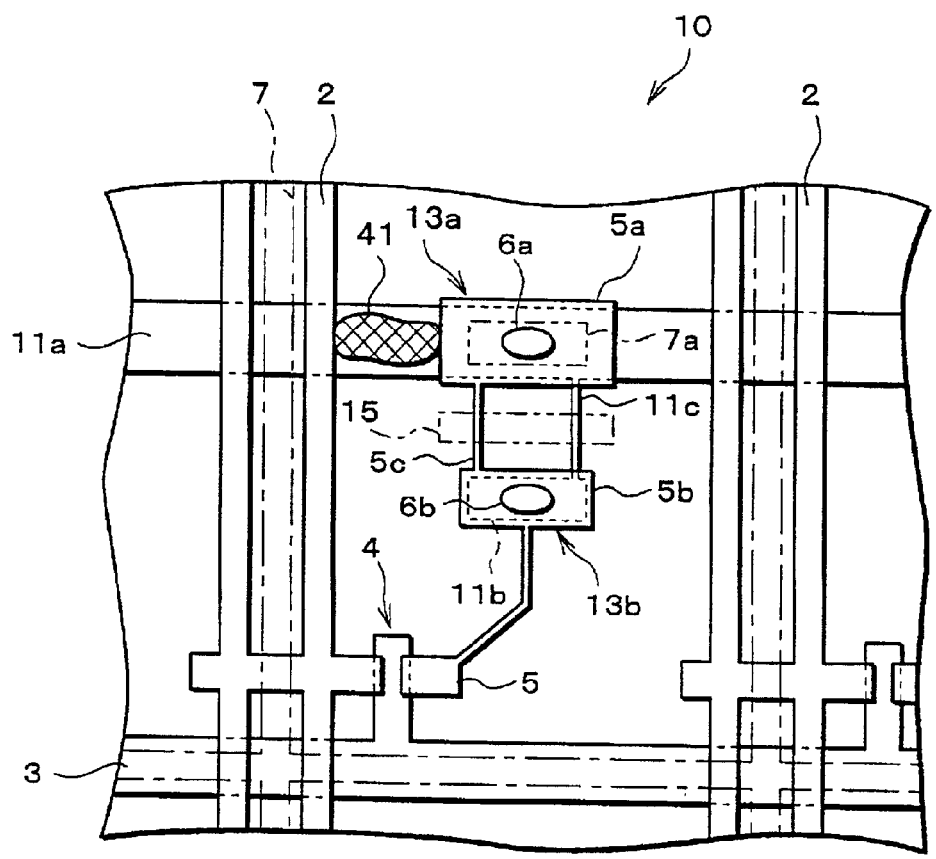
FIG. 5 is a plan view showing still another embodiment of the liquid crystal display device and the deficiency correcting method of the same according to the present invention, and particularly the liquid crystal display panel of FIG. 1 in a short-circuited state due to a film residue in source wiring and a connection electrode.
Figure 6:
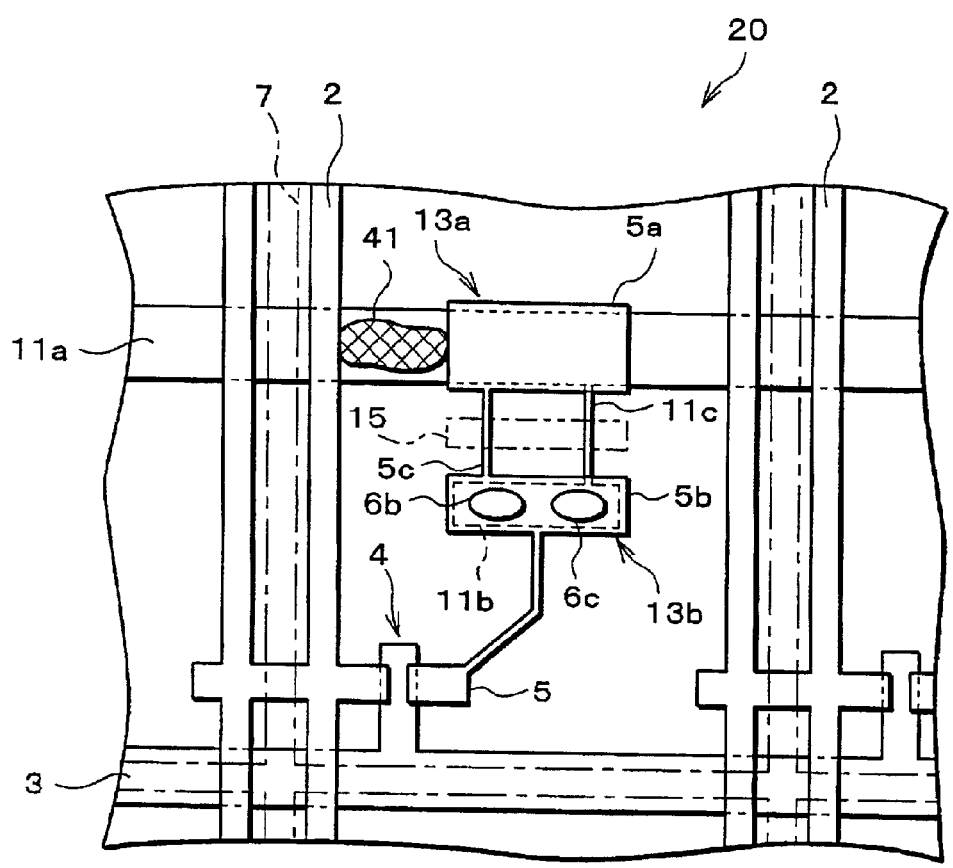
FIG. 6 is a plan view showing the liquid crystal display device and the deficiency correcting method thereof and particularly the liquid crystal display panel of FIG. 3 in a short-circuited state due to a film residue source wiring and a connection electrode.
Figure 7:
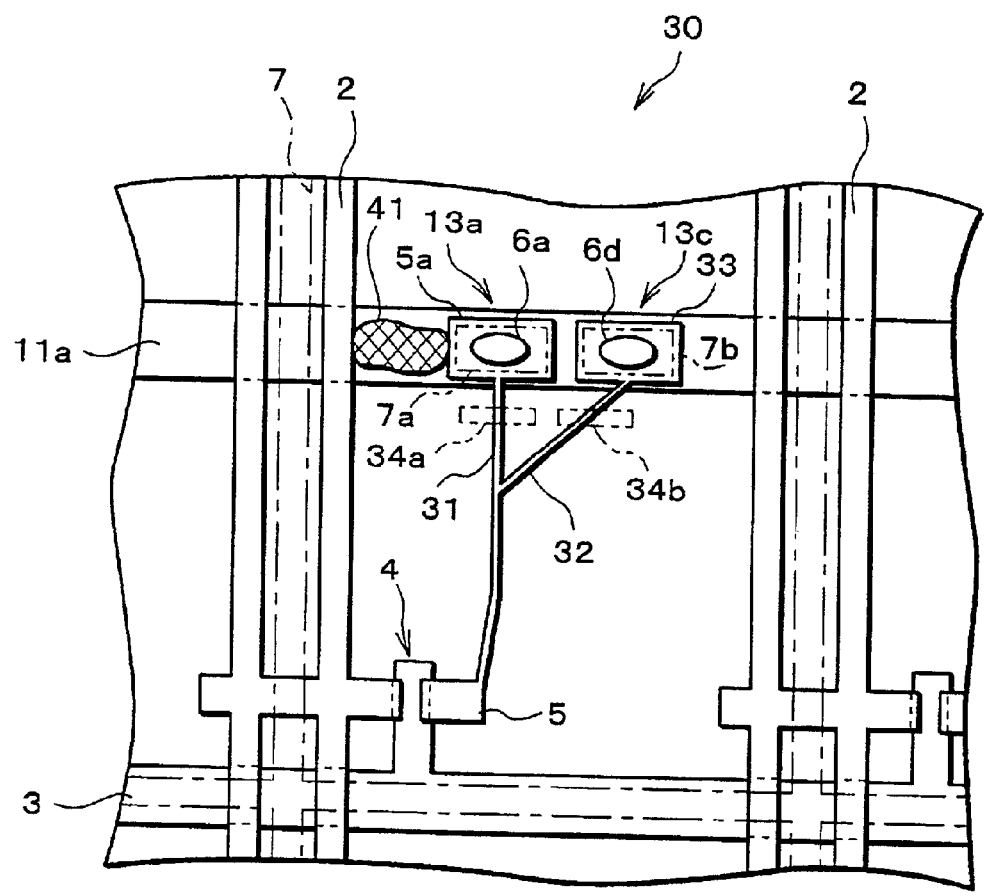
FIG. 7 is a plan view showing the liquid crystal display device and the deficiency correcting method thereof and particularly the liquid crystal display panel of FIG. 4 in a short-circuited state due to a film residue in source wiring and a connection electrode.
Figure 8:
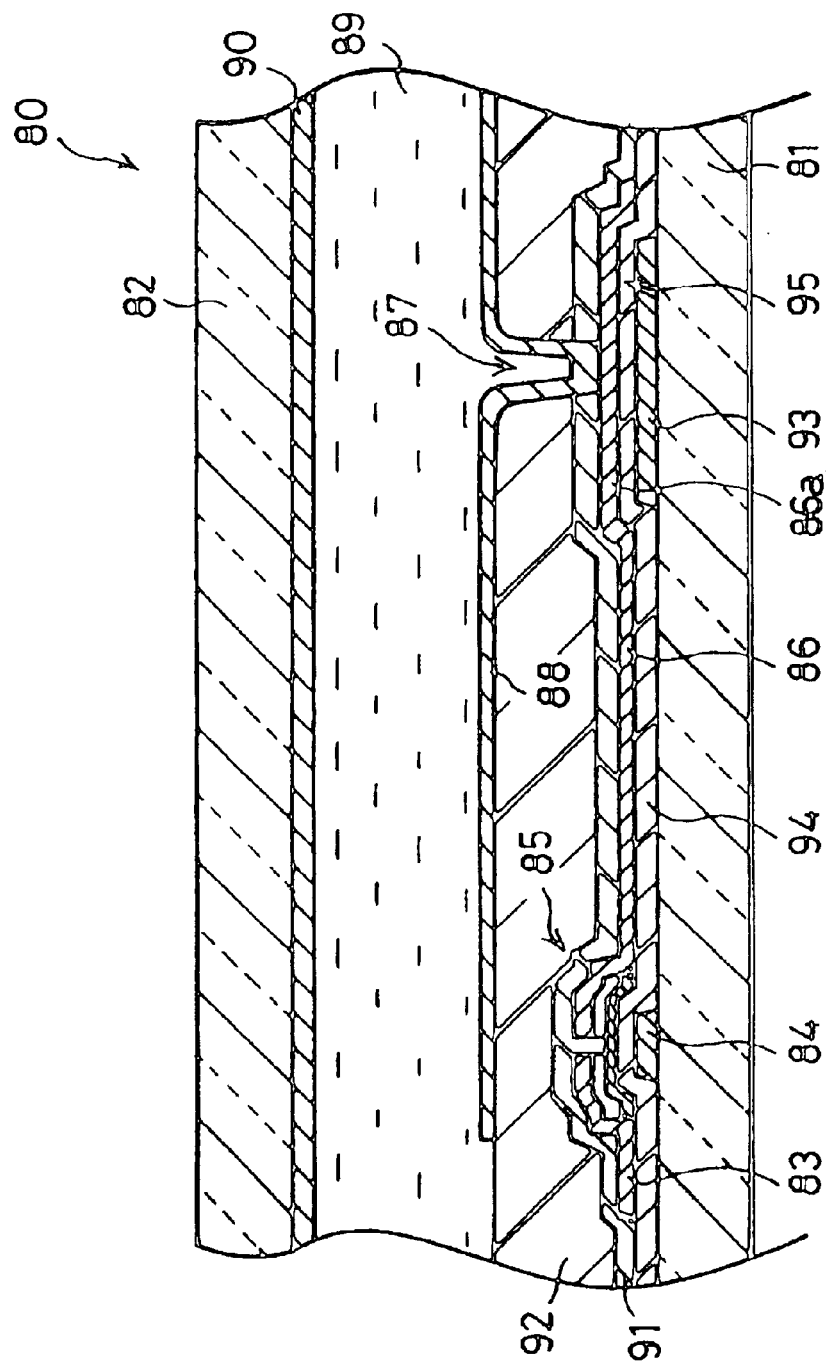
FIG. 8 is a cross sectional view of a liquid crystal display panel of a conventional liquid crystal display device.
Figure 9:
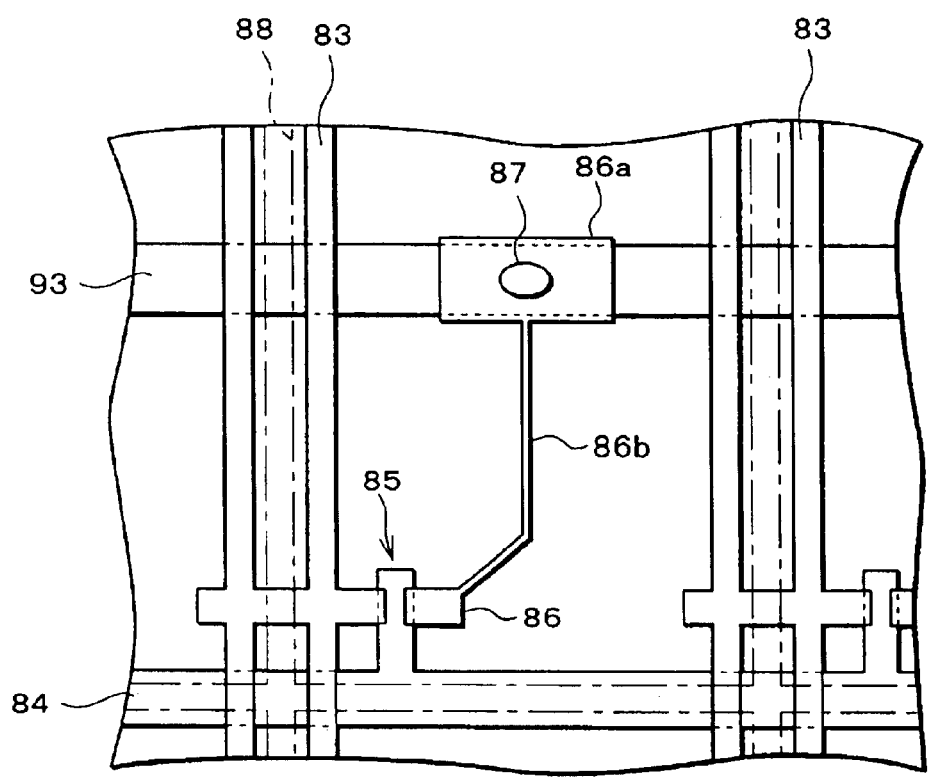
FIG. 9 is a plan view showing the liquid crystal display panel of the liquid crystal display device.

The following will explain another embodiment of the present invention with reference to FIGS. 5 through 7. For ease of explanation, components having the same functions as those shown in the drawings pertaining to the First to Third Embodiments above will be given the same reference symbols, and explanation thereof will be omitted here. In addition, various features described in the First to Third Embodiments are considered to be applicable in combination in the present embodiment.

Further, in the present embodiment, in the liquid crystal display panels 10, 20 and 30 which are liquid crystal display devices respectively described in the First to Third Embodiments above, explanation of a deficiency correcting method will be made through the case where a short circuit occurs between source wiring 2 and a connection electrode 5a, which is an electrode on a side more distant from a TFT 4 than the other and is a drain electrode.

First, a conventional liquid crystal display panel has a problem that, in the case where a leak occurs between the source wiring 2 and the drain electrode 5 which includes the connection electrode 5a, the leaking defect cannot be corrected.

In contrast, the liquid crystal display panels 10, 20 and 30 have the foregoing arrangements, respectively. Accordingly, when the leaking defect emerges in either of the liquid crystal display panels 10, 20 and 30, the following countermeasures are available.

Namely, in the liquid crystal display panel 10, as shown in FIG. 5, for example, when a film residue 41 and the like exist between the source wiring 2 and the connection electrode 5a in the manufacturing process of the source wiring 2 and the connection electrode 5a, there may arise a defect such that the source wiring 2 and the connection electrode 5a are short-circuited.

In that case, first, in the liquid crystal display panel 10, a drain thin line portion 5c and an auxiliary capacitance electrode thin line portion 11c which an additional coupling portion are laser-cut off, and further, the connection electrode 5a and a pixel electrode 7 are electrically disconnected, thereby correcting the leaking defect.

In other words, by thus laser-cutting the drain thin line portion 5c and the auxiliary capacitance electrode thin line portion 11c off, and electrically disconnecting the connection electrode 5a from the pixel electrode 7, an adverse effect which may be caused by the source wiring 2 does not reach beyond the isolated connection electrode 5a.

Further, even when thus making a correction in which the connection electrode 5a and the pixel electrode 7 are electrically disconnected, an island connection electrode 5b which is an electrode provided on a side closer to a TFT 4 is still in contact with the pixel electrode 7, thereby enabling a pixel in that portion to be electrically connected with the drain electrode 5.

As a result, it is possible to provide the liquid crystal display panel 10 and the deficiency correcting method thereof capable of an easy correction of a leaking defect between the source wiring 2 and the drain electrode 5 and normalization of pixels.

Next, as shown in FIG. 6, in the liquid crystal display panel 20, for example, in the manufacturing process of the source wiring 2 and the connection electrode 5a, a defect such that the source wiring 2 and the connection electrode 5a are short-circuited may also emerge when the film residue 41 exists between the source wiring 2 and the connection electrode 5a.

In that case, in the liquid crystal display panel 20, the leaking defect can be corrected by laser-cutting the drain thin line portion 5c and the auxiliary capacitance electrode thin line portion 11c off.

In other words, by thus laser-cutting the drain thin line portion 5c and the auxiliary capacitance electrode thin line portion 11c off, and electrically disconnecting the connection electrode 5a from the pixel electrode 7, an adverse effect which may be caused by the source wiring 2 does not reach beyond the isolated connection electrode 5a.

Further, even when thus making a correction in which the drain thin line portion 5c and the auxiliary capacitance electrode thin line portion 11c are laser-cut off, an island connection electrode 5b which is an electrode provided on the side closer to the TFT 4 is still in contact with the pixel electrode 7, thereby enabling a pixel in that portion to be electrically connected with the drain electrode 5.

As a result, it is possible to provide the liquid crystal display panel 20 and the deficiency correcting method thereof capable of an easy correction of a leaking defect between the source wiring 2 and the drain electrode 5 and normalization of pixels.

Further, likewise, as shown in FIG. 7, in the liquid crystal display panel 30, for example, in the manufacturing process of the source wiring 2 and the connection electrode 5a and a branch-side connection electrode 33 which are electrodes disposed at two different portions, when the film residue 41 and the like exist between the source wiring 2 and either the connection electrode 5a or the branch-side connection electrode 33, there may occur a defect such that either one of the connection electrode 5a and the branch-side connection electrode 33 provided at two different portions and the source wiring 2 are short-circuited.

When, in the liquid crystal display panel 30, a short circuit occurs between either one of the connection electrode 5a and the branch-side connection electrode 33 and the source wiring 2, a drain thin line portion 31 on a short-circuited side, for example, that leading to the connection electrode 5a is laser-cut off, and further, the connection electrode 5a on the short-circuited side and the pixel electrode 7 are electrically disconnected, thereby correcting the leaking defect.

In other words, by thus laser-cutting the drain thin line portion 31 leading to the connection electrode 5a on the short-circuited side off and electrically disconnecting the connection electrode 5a on the short-circuited side from the pixel electrode 7, an adverse effect which may be caused by the source wiring 2 does not reach beyond the isolated connection electrode 5a on the short-circuited side.

Further, even when thus making a correction in which the drain thin line portion 31 is laser-cut off, and the connection electrode 5a on the short-circuited side and the pixel electrode 7 are electrically disconnected, the branch-side connection electrode 33 is still in contact with the pixel electrode 7, thereby enabling a pixel in that portion to be electrically connected with the drain electrode 5.

As a result, it is possible to provide the liquid crystal display panel 30 and the deficiency correcting method thereof capable of an easy correction of a leaking defect between the source wiring 2 and the drain electrode 5 and normalization of pixels.

Further, in the foregoing deficiency correcting methods of the respective liquid crystal display panels 10, 20 and 30, the drain thin line portion 5c and the auxiliary capacitance electrode thin line portion 11c are made of thin lines. Therefore, when laser-cutting the drain thin line portion 5c and the auxiliary capacitance electrode thin line portion 11c off, the thin lines require to be cut off, thereby surely and easily making a correction when a short circuit occurs. Note that, in the present invention, this is not limited, and other wiring can also be adopted.

Further, in the foregoing deficiency correcting methods of the respective liquid crystal display panels 10, 20 and 30, pad electrodes are used as the connection electrode 5a, the island connection electrode 5b and the branch-side connection electrode 33. This make it possible to provide a deficiency correcting method of a liquid crystal display device capable of an easy correction of a leaking defect and normalization of pixels in the liquid crystal display panel 10, 20 and 30 adopting the pad electrodes as the connection electrode 5a, the island connection electrode 5b and the branchside connection electrode 33. Note that, another electrode can also be adopted.

Further, in the foregoing deficiency correcting methods of the respective liquid crystal display panels 10, 20 and 30, it is possible to provide a liquid crystal display device and a deficiency correcting method thereof capable of an easy correction of a leaking defect and normalization of pixels in the liquid crystal display panel 10, 20 and 30 adopting the TFT 4 as the switching element. Note that, in the present invention, this is not limited, and another switching element can also be adopted.

As described, in an arrangement of the liquid crystal display device according to the present invention, a correction can be made with respect to not only a leaking defect between a drain electrode and an auxiliary capacitance electrode but also a leaking defect between a drain electrode (an electrode on a distant side) and source wiring. Further, a numerical aperture of a liquid crystal display device is higher than that of a liquid crystal display device as disclosed in the Japanese Unexamined Patent Publication No. 80723/1992. Moreover, only laser-cutting is required for the correction, and melting as with the above publication is not required, thus providing an easy correcting process, thereby increasing a success rate of correction.

As described, the liquid crystal display device according to the present invention may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are serially disposed at two different portions on an extension portion of the drain electrode of the switching element in an extending direction and connected to each other via a coupling portion in-between, and the two electrodes are respectively connected to the pixel electrode via through holes respectively formed in a layer insulating film, where one of the two electrodes which is disposed more distant from the switching element than the other is stacked via the auxiliary capacitance electrode and an insulating film in-between so as to form the storage capacitance, and the other disposed closer to the switching element is stacked via an auxiliary capacitance electrode extension portion which is connected to the auxiliary capacitance electrode at an additional coupling portion, and the insulating film in-between so as to form an additional storage capacitance.

In a liquid crystal display device according to the foregoing invention, gate wiring and source wiring are disposed in a lattice state. There are formed a switching element on each lattice point, a pixel electrode to be connected to a drain electrode of the switching element, and an auxiliary capacitance electrode. The auxiliary capacitance electrode, in order to form a storage capacitance which is serially connected to the pixel electrode, is formed in the same process as, and disposed in parallel with, the gate wiring.

Meanwhile, a conventional liquid crystal display device has a problem such that, when a leak occurs between the auxiliary capacitance electrode and the drain electrode, the leaking defect cannot be corrected.

However, in the liquid crystal display device according to the present invention, at two portions on an extension portion of the drain electrode of the switching element, electrodes which are coupled with each other via a coupling portion are serially provided in an extending direction. In addition, the two electrodes are respectively connected to the pixel electrode via through holes which are respectively formed in a layer insulating film. Further, one of the two electrodes which is disposed distant from the switching element is stacked via the auxiliary capacitance electrode and an insulating film in-between so as to form a storage capacitance. On the other hand, the other of the two electrodes which is disposed closer to the switching element is stacked via an auxiliary capacitance electrode extension portion which is connected to the auxiliary capacitance electrode at an additional coupling portion, and the insulating film in-between so as to form an additional storage capacitance.

Therefore, in the present liquid crystal display device, when a short circuit occurs between either the auxiliary capacitance electrode or source wiring and the distantly disposed electrode, a leaking defect can be corrected by laser-cutting the coupling and additional coupling portions off, and further, by electrically disconnecting the distantly disposed electrode from the pixel electrode.

Further, even when thus making a correction in which the distantly disposed electrode and the pixel electrode are electrically disconnected, the closer electrode is still in contact with the pixel electrode, thereby enabling a pixel in that portion to be electrically connected with the drain electrode.

On the other hand, in the present liquid crystal display device, when a short circuit occurs between the auxiliary capacitance electrode extension portion and the closer electrode, a leaking defect can be corrected by laser-cutting the coupling and additional coupling portions off.

Further, even when thus cutting the coupling and additional coupling portions off, the pixel electrode stays short-circuited with the auxiliary capacitance electrode extension portion. However, the auxiliary capacitance electrode extension portion is disconnected from the auxiliary capacitance electrode and therefore acts as a drain electrode, thereby causing no adverse effect.

As a result, it is possible to provide a liquid crystal display device capable of an easy correction of leaking defects between the auxiliary capacitance electrode and the drain electrode and between the source wiring and the drain electrode, and normalization of pixels.

Further, the liquid crystal display device according to the present invention may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are serially disposed at two different portions on an extension portion of the drain electrode of the switching element in an extending direction and connected to each other via a coupling portion in-between, one of the two electrodes disposed closer to the switching element is connected to the pixel electrode via a through hole formed in a layer insulating film and stacked via an auxiliary capacitance electrode extension portion which is connected to the auxiliary capacitance electrode at an additional coupling portion, and an insulating film in-between so as to form an additional storage capacitance, and the other of the two electrodes disposed distant from the switching element is stacked via the auxiliary capacitance electrode and the insulating film in-between so as to form the storage capacitance.

In accordance with the foregoing invention, electrodes are serially disposed at two different portions on the extension portion of the drain electrode of the switching element in the extending direction and connected to each other via the coupling portion in-between. In addition, one of the two electrodes disposed closer to the switching element is connected to the pixel electrode via the through hole formed in the layer insulating film in-between. Further, the closer electrode is stacked via the auxiliary capacitance electrode extension portion which is connected to the auxiliary capacitance electrode at the additional storage portion, and the insulating film in-between so as to form the additional storage capacitance. On the other hand, the other of the two electrodes disposed distant from the switching element is stacked via the auxiliary capacitance electrode and the insulating film in-between so as to form the storage capacitance.

Therefore, in the liquid crystal display device, when a short circuit occurs between either the auxiliary capacitance electrode or source wiring and the distantly disposed electrode, a leaking defect can be corrected by laser-cutting the coupling and additional coupling portions off.

Further, even when thus making a correction in which the coupling and additional coupling portions are laser-cut off, the closer electrode is still in contact with the pixel electrode, thereby enabling a pixel in that portion to be electrically connected with the drain electrode.

On the other hand, in the present liquid crystal display device, when a short circuit occurs between the auxiliary capacitance electrode extension portion and the closer electrode, a leaking defect can be corrected by laser-cutting the coupling and additional coupling portions off.

Further, even when thus cutting the coupling and additional coupling portions off, the pixel electrode stays short-circuited with the auxiliary capacitance electrode extension portion. However, the auxiliary capacitance electrode extension portion is disconnected from the auxiliary capacitance electrode and therefore acts as a drain electrode, thereby causing no adverse effect.

As a result, it is possible to provide a liquid crystal display device capable of an easy correction of leaking defects between the auxiliary capacitance electrode and the drain electrode and between the source wiring and the drain electrode, and normalization of pixels.

Further, the present liquid crystal display device may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are disposed in parallel at two different portions on an extension portion of the drain electrode of the switching element in an extending direction and connected to each other via a coupling portion in-between, and the two electrodes are respectively connected to the pixel electrode via through holes respectively formed in a layer insulating film and stacked via the auxiliary capacitance electrode and an insulating film in-between so as to respectively form the storage capacitances.

In accordance with the foregoing invention, electrodes are disposed in parallel at two different portions on the extension portion of the drain electrode of the switching element in the extending direction and connected to each other via the coupling portion in-between. In addition, the two electrodes are respectively connected to the pixel electrode via the through holes respectively formed in the layer insulating film and stacked via the auxiliary capacitance electrode and the insulating film in-between so as to respectively form the storage capacitances.

Therefore, in the present liquid crystal display device, when a short circuit occurs between either one of the two electrodes and either the auxiliary capacitance electrode or source wiring, a leaking defect can be corrected by laser-cutting the coupling portions leading to a short-circuited side off, and further, by electrically disconnecting the electrode on the short-circuited side from the pixel electrode.

Further, even when thus making a correction in which the coupling portion is laser-cut off, and the electrode on the short-circuited side and the pixel electrode are electrically disconnected, the other electrode is still in contact with the pixel electrode, thereby enabling a pixel in that portion to be electrically connected with the drain electrode.

As a result, it is possible to provide a liquid crystal display device capable of an easy correction of leaking defects between the auxiliary capacitance electrode and the drain electrode and between the source wiring and the drain electrode, and normalization of pixels.

Further, a deficiency correcting method of a liquid crystal display device according to the present invention may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are serially disposed at two different portions on an extension portion of the drain electrode of the switching element in an extending direction and connected to each other via a coupling portion in-between, the two electrodes are respectively connected to the pixel electrode via through holes respectively formed in a layer insulating film, one of the two electrodes which is disposed more distant from the switching element than the other is stacked via the auxiliary capacitance electrode and an insulating film in-between so as to form the storage capacitance, whereas the electrode disposed closer to the switching element is stacked via an auxiliary capacitance electrode extension portion which is connected to the auxiliary capacitance electrode at an additional coupling portion, and the insulating film in-between so as to form an additional storage capacitance, and when a short circuit occurs between the auxiliary capacitance electrode and the distantly disposed electrode, the coupling portion and the additional coupling portion are laser-cut off, and further, the distantly disposed electrode and the pixel electrode are electrically disconnected, and when a short circuit occurs between the auxiliary capacitance electrode extension portion and the electrode disposed closer to the switching element, the coupling portion and the additional coupling portion are laser-cut off.

In a liquid crystal display device according to the foregoing invention, gate wiring and source wiring are disposed in a lattice state. There are formed a switching element on each lattice point, a pixel electrode to be connected to a drain electrode of the switching element, and an auxiliary capacitance electrode. The auxiliary capacitance electrode, in order to form a storage capacitance which is serially connected to the pixel electrode, is formed in the same process as, and disposed in parallel with, the gate wiring.

Further, in the liquid crystal display device, at two portions on an extension portion of the drain electrode of the switching element, electrodes which are coupled with each other via a coupling portion are serially provided in an extending direction. The two electrodes are respectively connected to the pixel electrode via through holes which are respectively formed in a layer insulating film. One of the two electrodes disposed distant from the switching element is stacked via the auxiliary capacitance electrode and an insulating film in-between so as to form a storage capacitance. On the other hand, the other of the two electrodes disposed closer to the switching element is stacked via an auxiliary capacitance electrode extension portion which is connected to the auxiliary capacitance electrode at an additional coupling portion, and the insulating film in-between so as to form an additional storage capacitance.

Further, in the present liquid crystal display device, when a short circuit occurs between the auxiliary capacitance electrode and the distantly disposed electrode, the coupling and additional coupling portions are laser-cut off, and further, the distantly disposed electrode and the pixel electrode are electrically disconnected.

Further, even when thus making a correction in which the distantly disposed electrode and the pixel electrode are electrically disconnected, the closer electrode is still in contact with the pixel electrode, thereby enabling a pixel in that portion to be electrically connected with the drain electrode.

On the other hand, in the present liquid crystal display device, when a short circuit occurs between the auxiliary capacitance electrode extension portion and the closer electrode, a leaking defect can be corrected by laser-cutting the coupling and additional coupling portions off.

Further, even when thus cutting the coupling and additional coupling portions off, the pixel electrode stays short-circuited with the auxiliary capacitance electrode extension portion. However, the auxiliary capacitance electrode extension portion is disconnected from the auxiliary capacitance electrode and therefore acts as a drain electrode, thereby causing no adverse effect.

As a result, it is possible to provide a liquid crystal display device capable of an easy correction of a leaking defect between the auxiliary capacitance electrode and the drain electrode, and normalization of pixels.

Further, a deficiency correcting method of a liquid crystal display device according to the present invention may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are serially disposed at two different portions on an extension portion of the drain electrode of the switching element in an extending direction and connected to each other via a coupling portion in-between, one of the two electrodes disposed closer to the switching element is connected to the pixel electrode via a through hole formed in a layer insulating film and stacked via an auxiliary capacitance electrode extension portion which is connected to the auxiliary capacitance electrode at an additional coupling portion, and an insulating film in-between so as to form an additional storage capacitance, the other of the two electrodes disposed distant from the switching element is stacked via the auxiliary capacitance electrode and the insulating film in-between so as to form the storage capacitance, and when a short circuit occurs between the auxiliary capacitance electrode and the distantly disposed electrode, the coupling and additional coupling portions are laser-cut off, whereas when a short circuit occurs between the auxiliary capacitance electrode extension portion and the closer electrode, the coupling and additional coupling portions are laser-cut off.

In accordance with the foregoing invention, electrodes are serially disposed at two different portions on the extension portion of the drain electrode of the switching element in the extending direction and connected to each other via the coupling portion in-between.

In addition, one of the two electrodes which is disposed closer to the switching element is connected to the pixel electrode via the through hole formed in the layer insulating film and stacked via the auxiliary capacitance electrode extension portion which is connected to the auxiliary capacitance electrode at the additional coupling portion, and the insulating film in-between so as to form the additional storage capacitance.

Further, the other of the two electrodes which is disposed distant from the switching element is stacked via the auxiliary capacitance electrode and the insulating film in-between so as to form the storage capacitance.

Further, in the present liquid crystal display device, when a short circuit occurs between the auxiliary capacitance electrode and the distantly disposed electrode, a leaking defect can be corrected by laser-cutting the coupling and additional coupling portions off.

Further, even when thus making a correction in which the coupling and additional coupling portions are laser-cut off, the closer electrode is still in contact with the pixel electrode, thereby enabling a pixel in that portion to be electrically connected with the drain electrode.

On the other hand, in the present liquid crystal display device, when a short circuit occurs between the auxiliary capacitance electrode extension portion and the closer electrode, a leaking defect can be corrected by laser-cutting the coupling and additional coupling portions off.

Further, even when thus laser-cutting the coupling and additional coupling portions off, the pixel electrode stays short-circuited with the auxiliary capacitance electrode extension portion. However, the auxiliary capacitance electrode extension portion is disconnected from the auxiliary capacitance electrode and therefore acts as a drain electrode, thereby causing no adverse effect.

As a result, it is possible to provide a liquid crystal display device capable of an easy correction of a leaking defect between the auxiliary capacitance electrode and the drain electrode, and normalization of pixels.

Further, a deficiency correcting method of a liquid crystal display device according to the present invention may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are disposed in parallel at two different portions on an extension portion of the drain electrode of the switching element in an extending direction and connected to each other via a coupling portion in-between, the two electrodes are respectively connected to the pixel electrode via through holes respectively formed in a layer insulating film and stacked via the auxiliary capacitance electrode and the insulating film in-between so as to respectively form the storage capacitances, and when a short circuit occurs between either one of the two electrodes and the auxiliary capacitance electrode, the coupling portion leading to the electrode on a short-circuited side is laser-cut off, and further, the electrode on the short-circuited side and the pixel electrode are electrically disconnected.

In the liquid crystal display device according to the foregoing invention, electrodes are disposed in parallel at two different portions on the extension portion of the drain electrode of the switching element in the extending direction and connected to each other via the coupling portion in-between. The two electrodes are respectively connected to the pixel electrode via the through holes respectively formed in the layer insulating film and stacked via the auxiliary capacitance electrode and the insulating film in-between so as to respectively form the storage capacitances.

Further, in the present liquid crystal display device, when a short circuit occurs between either one of the two electrodes and the auxiliary capacitance electrode, a leaking defect can be corrected by laser-cutting the coupling portion leading to the electrode on a short-circuited side off, and further, by electrically disconnecting the electrode on the short-circuited side and the pixel electrode.

Further, even when thus making a correction in which the coupling portion is laser-cut off, and further, the electrode on the short-circuited side and the pixel electrode are electrically disconnected, the other electrode is still in contact with the pixel electrode, thereby enabling a pixel in that portion to be electrically connected with the drain electrode.

As a result, it is possible to provide a liquid crystal display device capable of an easy correction of a leaking defect between the auxiliary capacitance electrode and the drain electrode, and normalization of pixels.

Further, a deficiency correcting method of a liquid crystal display device according to the present invention may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are serially disposed at two different portions on an extension portion of the drain electrode of the switching element in an extending direction and connected to each other via a coupling portion in-between, the two electrodes being respectively connected to the pixel electrode via through holes respectively formed in a layer insulating film, one of the two electrodes which is disposed more distant from the switching element than the other is stacked via the auxiliary capacitance electrode and an insulating film in-between so as to form the storage capacitance, whereas the electrode disposed closer to the switching element is stacked via an auxiliary capacitance electrode extension portion which is connected to the auxiliary capacitance electrode at an additional coupling portion, and the insulating film in-between so as to form an additional storage capacitance, and when a short circuit occurs between the source wiring and the distantly disposed electrode, the coupling and additional coupling portions are laser-cut off, and further, the distantly disposed electrode and the pixel electrode are electrically disconnected.

In accordance with the foregoing invention, in the liquid crystal display device, when a short circuit occurs between the source wiring and the distantly Ace disposed electrode due to, for example, a film residue and the like, a leaking defect can be corrected by laser-cutting the coupling and additional coupling portions off, and further, by electrically disconnecting the distantly disposed electrode and the pixel electrode.

Namely, by thus laser-cutting the coupling and additional coupling portions and electrically disconnecting the distantly disposed electrode from the pixel electrode off, an adverse effect which may be caused by the source wiring does not reach beyond the isolated distantly disposed electrode.

In addition, even when thus making a correction in which the distantly disposed electrode and the pixel electrode are electrically disconnected, the closer electrode is still in contact with the pixel electrode, thereby enabling a pixel in that portion to be electrically connected with the drain electrode.

As a result, it is possible to provide a deficiency correcting method of a liquid crystal display device capable of an easy correction of a leaking defect between the source wiring and the drain electrode, and normalization of pixels.

Further, a deficiency correcting method of a liquid crystal display device according to the present invention may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are serially disposed at two different portions on an extension portion of the drain electrode of the switching element in an extending direction and connected to each other via a coupling portion in-between, one of the two electrodes disposed closer to the switching element is connected to the pixel electrode via a through hole formed in a layer insulating film and stacked via an auxiliary capacitance electrode extension portion which is connected to the auxiliary capacitance electrode at an additional coupling portion, and an insulating film in-between so as to form an additional storage capacitance, the other of the two electrodes disposed distant from the switching element is stacked via the auxiliary capacitance electrode and the insulating film in-between so as to form the storage capacitance, and when a short circuit occurs between the source wiring and the distantly disposed electrode, the coupling and additional coupling portions are laser-cut off.

In accordance with the foregoing invention, in the liquid crystal display device, when a short circuit occurs between the source wiring and the distantly disposed electrode due to, for example, a film residue and the like, a leaking defect can be corrected by laser-cutting the coupling and additional coupling portions off.

Namely, by thus laser-cutting the coupling and additional coupling portions and electrically disconnecting the distantly disposed electrode from the pixel electrode, an adverse effect which may be caused by the source wiring does not reach beyond the isolated distantly disposed electrode.

In addition, even when thus making a correction in which the coupling and additional coupling portions are laser-cut off, the closer electrode is still in contact with the pixel electrode, thereby enabling a pixel in that portion to be electrically connected with the drain electrode.

As a result, it is possible to provide a deficiency correcting method of a liquid crystal display device capable of an easy correction of a leaking defect between the source wiring and the drain electrode, and normalization of pixels.

Further, a deficiency correcting method of a liquid crystal display device according to the present invention may have an arrangement which includes: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, wherein electrodes are disposed in parallel at two different portions on an extension portion of the drain electrode of the switching element in an extending direction and connected to each other via a coupling portion in-between, the two electrodes are respectively connected to the pixel electrode via through holes respectively formed in a layer insulating film and stacked via the auxiliary capacitance electrode and the insulating film in-between so as to respectively form the storage capacitances, and when a short circuit occurs between either one of the two electrodes and the source wiring, the coupling portion leading to the electrode on a short-circuited side is laser-cut off, and further, the electrode on the short-circuited side and the pixel electrode are electrically disconnected.

In accordance with the foregoing invention, in the liquid crystal display device, when a short circuit occurs between either one of the two electrodes and the source wiring, a leaking defect can be corrected by laser-cutting the coupling portion leading to the electrode on the short-circuited side off, and further, by electrically disconnecting the electrode on the short-circuited side and the pixel electrode.

Namely, by thus laser-cutting the coupling portion leading to the electrode on the short-circuited side off, and electrically disconnecting the electrode on the short-circuited side from the pixel electrode, an adverse effect which may be caused by the source wiring does not reach beyond the isolated electrode on the short-circuited side.

In addition, even when thus making a correction in which the coupling portion is laser-cut off, and the electrode on the short-circuited side is electrically disconnected from the pixel electrode, the other electrode is still in contact with the pixel electrode, thereby enabling a pixel in that portion to be electrically connected with the drain electrode.

As a result, it is possible to provide a deficiency correcting method of a liquid crystal display device capable of an easy correction of a leaking defect between the source wiring and the drain electrode, and normalization of pixels.

Further, the foregoing liquid crystal display device and the deficiency correcting method thereof according to the present invention may have an arrangement in which the coupling and additional coupling portions are respectively made of thin lines.

In accordance with the foregoing invention, by thus forming the coupling and additional coupling portions of thin lines, the thin lines require to be cut off when laser-cutting the coupling and additional coupling portions off, thereby making a correction surely and easily when a short circuit occurs.

Further, the foregoing liquid crystal display device and the deficiency correcting method thereof may have an arrangement in which the coupling and additional coupling portions are respectively made of lines, each of which has the size that makes the line available for laser-cutting.

Further, the foregoing liquid crystal display device and the deficiency correcting method thereof may have an arrangement in which the electrodes are pad electrodes.

In accordance with the foregoing invention, it is possible to provide a liquid crystal display device and a deficiency correcting method thereof capable of an easy correction of a leaking defect in the liquid crystal display device adopting the pad electrodes as its electrodes, and normalization of pixels.

Further, the foregoing liquid crystal display device and the deficiency correcting method thereof may have an arrangement in which the switching element is a thin film transistor.

In accordance with the foregoing invention, it is possible to provide a liquid crystal display device and a deficiency correcting method thereof capable of an easy correction of a leaking defect in the liquid crystal display device adopting the thin film transistor as its switching element, and normalization of pixels.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A liquid crystal display device, comprising:
    gate wiring and source wiring disposed in a lattice state;
    a switching element provided on each lattice point;
    a pixel electrode to be connected to a drain electrode of the switching element;
    an auxiliary capacitance electrode which is formed in the same manufacturing process as the gate wiring and disposed in parallel with the gate wiring so as to form a storage capacitance which is serially connected to the pixel electrode; and
    electrodes which are disposed in parallel at two different portions on an extension portion of the drain electrode of the switching element in an extending direction and connected to each other via a coupling portion to connect with the drain electrode, and a branch coupling portion which branches off from the coupling portion in-between,
    wherein:
    said electrodes disposed in parallel are connected to the pixel electrodes via through holes which are respectively formed in a layer insulating film, which is on said electrodes, and stacked via the auxiliary capacitance electrode and insulating film so as to respectively form the storage capacitances, and
    said pixel electrode is connected to said switching element through said electrodes disposed at two different portions on said extension portion of the drain electrode.

2. The liquid crystal display device as set forth in claim 1, wherein the coupling portion and the branch coupling portion are respectively made of thin lines.

3. The liquid crystal display device as set forth in claim 1, wherein the two electrodes are pad electrodes, respectively.

4. The liquid crystal display device as set forth in claim 1, wherein the switching element is a thin film transistor.

5. A liquid crystal display device, comprising:
    gate wiring and source wiring disposed in a lattice state;
    a switching element provided on each lattice point;
    a pixel electrode to be connected to a drain electrode of the switching element;
    an auxiliary capacitance electrode which is formed in the same manufacturing process as the gate wiring and disposed in parallel with the gate wiring so as to form a storage capacitance which is serially connected to the pixel electrode; and
    electrodes which are disposed in parallel at two different portions on an extension portion of the drain electrode of the switching element in an extending direction and connected to each other via a coupling portion to connect with the drain electrode, and a branch coupling portion which branches off from the coupling portion in-between,
    wherein:
    said electrodes disposed in parallel are connected to the pixel electrodes via through holes which are respectively formed in a layer insulating film, which is on said electrodes, to provide a connection to a drain electrode of the switching element and stacked via the auxiliary capacitance electrode and insulating film so as to respectively form the storage capacitances; and
    wherein when one of said electrodes is short-circuited, a portion of the through hole connecting the short-circuited electrode to the pixel electrode and a portion the extension portion of the drain electrode of the switching element are cut to isolate the short-circuited electrode from the drain electrode of the switching element.

6. The liquid crystal display device as set forth in claim 5, wherein the coupling portion and the branch coupling portion are respectively made of thin lines.

7. The liquid crystal display device as set forth in claim 5, wherein the two electrodes are pad electrodes, respectively.

8. The liquid crystal display device as set forth in claim 5, wherein the switching element is a thin film transistor.

9. A deficiency correcting method of a liquid crystal display device, the liquid crystal display device including: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode,
    the liquid crystal display device further including electrodes which are disposed in parallel at two different portions on an extension portion of the drain electrode of the switching element in an extending direction and connected to each other via a coupling portion to connect with the drain electrode, and a branch coupling portion which branches off from the coupling portion in-between,
    wherein:
    said electrodes disposed in parallel are connected to the pixel electrodes via through holes which are respectively formed in a layer insulating film, which is on said electrodes, and stacked via the auxiliary capacitance electrode and insulating film so as to respectively form the storage capacitances, and said pixel electrode is connected to said switching element through said electrodes disposed at two different portions on said extension portion of the drain electrode, the method, when a short circuit occurs between either one of the two electrodes and the auxiliary capacitance electrode, comprising the steps of:

laser-cutting the coupling portion or branch coupling portion that is connected to the electrode on a short-circuited side to provide a cut-off between said electrode on the short-circuited side and the drain electrode; and electrically disconnecting the electrode on the short-circuited side from the pixel electrode to remove a region of the pixel electrode on one of the through holes which is in contact with said electrode.

10. The method as set forth in claim 9, wherein the coupling portion and the branch coupling portion are respectively made of thin lines.

11. The method as set forth in claim 9, wherein the two electrodes are pad electrodes, respectively.

12. The method as set forth in claim 9, wherein the switching element is a thin film transistor.

13. A deficiency correcting method of a liquid crystal display device, the liquid crystal display device including: gate wiring and source wiring disposed in a lattice state; a switching element provided on each lattice point; a pixel electrode to be connected to a drain electrode of the switching element; and an auxiliary capacitance electrode which is formed in the same manufacturing process as the gate wiring and disposed in parallel with the gate wiring so as to form a storage capacitance which is serially connected to the pixel electrode, the liquid crystal display device further including electrodes which are disposed in parallel at two different portions on an extension portion of the drain electrode of the switching element in an extending direction and connected to each other via a coupling portion to connect with the drain electrode, and a branch coupling portion which branches off from the coupling portion in-between, wherein:

said electrodes disposed in parallel are connected to the pixel electrodes via through holes which are respectively formed in a layer insulating film, which is on said electrodes, and stacked via the auxiliary capacitance electrode and insulating film so as to respectively form the storage capacitances, the method, when a short circuit occurs between either one of the two electrodes and the auxiliary capacitance electrode, comprising the steps of:

laser-cutting the coupling portion or branch coupling portion that is connected to the electrode on a short-circuited side to provide a cut-off between said electrode on the short-circuited side and the drain electrode; and electrically disconnecting the electrode on the short-circuited side from the pixel electrode to remove a region of the pixel electrode on one of the through holes which is in contact with said electrode.

14. The method as set forth in claim 9, wherein the coupling portion and the branch coupling portion are respectively made of thin lines.

15. The method as set forth in claim 9, wherein the two electrodes are pad electrodes, respectively.

16. The method as set forth in claim 9, wherein the switching element is a thin film transistor.

* * * * *